US011803516B2

(12) United States Patent
Jewell et al.

(10) Patent No.: US 11,803,516 B2
(45) Date of Patent: Oct. 31, 2023

(54) SYSTEM AND METHOD FOR SELECTIVE SYNCHRONIZATION

(71) Applicant: Open Text SA ULC, Halifax (CA)

(72) Inventors: Brian Alexander Jewell, Kitchener (CA); Brennen Matthew Walsh, Waterloo (CA); Jinshan Yang, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 17/666,487

(22) Filed: Feb. 7, 2022

(65) Prior Publication Data

US 2022/0164315 A1 May 26, 2022

Related U.S. Application Data

(63) Continuation of application No. 15/997,286, filed on Jun. 4, 2018, now Pat. No. 11,301,431.

(60) Provisional application No. 62/514,221, filed on Jun. 2, 2017.

(51) Int. Cl.
| | |
|---|---|
| *G06F 12/00* | (2006.01) |
| *G06F 16/178* | (2019.01) |
| *G06F 16/172* | (2019.01) |
| *G06F 16/185* | (2019.01) |
| *G06F 16/17* | (2019.01) |
| *G06F 16/182* | (2019.01) |

(52) U.S. Cl.
CPC .......... *G06F 16/178* (2019.01); *G06F 16/172* (2019.01); *G06F 16/1734* (2019.01); *G06F 16/185* (2019.01); *G06F 16/1824* (2019.01)

(58) Field of Classification Search
None
See application file for complete search history.

(56) References Cited

U.S. PATENT DOCUMENTS

| | | | |
|---|---|---|---|
| 7,593,943 B2 * | 9/2009 | Clarke | G06F 16/273 |
| 9,602,618 B2 * | 3/2017 | Lowery | H04L 67/1097 |
| 11,314,778 B2 | 4/2022 | Hawa | |
| 11,698,885 B2 | 7/2023 | Jewell | |
| 2009/0157811 A1 | 6/2009 | Bailor | |
| 2014/0280779 A1 | 9/2014 | Paul | |

(Continued)

OTHER PUBLICATIONS

Office Action for U.S. Appl. No. 15/680,029, dated Feb. 10, 2022, 58 pgs.

(Continued)

*Primary Examiner* — Tuankhanh D Phan
(74) *Attorney, Agent, or Firm* — Sprinkle IP Law Group

(57) ABSTRACT

A client computer includes a synchronization manager. The synchronization manager communicates with a remote content management system to determine a set of objects in a content navigation hierarchy. The synchronization manager provides a user interface with controls to allow a user to independently select multiple objects in the content navigation hierarchy for synchronization and receives an input, via the interface, that selects objects from the set of objects for synchronization. The synchronization manager stores local peers of the selected objects in a local cache in a local file system. The synchronization manager synchronizes changes to the selected objects at the content management system to the local peers in the file system.

20 Claims, 9 Drawing Sheets

(56) References Cited

U.S. PATENT DOCUMENTS

2014/0281850 A1* 9/2014 Prakash ................ G06F 40/131
715/202
2016/0117298 A1 4/2016 Lemonik
2022/0207057 A1 6/2022 Hawa

OTHER PUBLICATIONS

Notice of Allowance for U.S. Appl. No. 17/139,803, dated Feb. 16, 2022, 10 pgs.
Office Action for U.S. Appl. No. 17/239,136, dated Apr. 28, 2022, 13 pgs.
Office Action for U.S. Appl. No. 17/239,136, dated Dec. 22, 2022, 14 pgs.
Office Action for U.S. Appl. No. 17/240,798, dated Oct. 25, 2022, 8 pgs.
Office Action for U.S. Appl. No. 17/239,136, dated Aug. 10, 2022, 16 pgs.
Notice of Allowance for U.S. Appl. No. 17/240,798, dated Feb. 23, 2023, 5 pgs.
Office Action for U.S. Appl. No. 17/698,358, dated Mar. 16, 2023, 23 pgs.
Office Action for U.S. Appl. No. 17/239,136, dated Apr. 25, 2023, 11 pgs.

* cited by examiner

SYSTEM AND METHOD FOR SELECTIVE SYNCHRONIZATION

RELATED APPLICATIONS

This application is a continuation of, and claims a benefit of priority under 35 U.S.C. 120 of, U.S. patent application Ser. No. 15/997,286 filed Jun. 4, 2018, issued as U.S. Pat. No. 11,301,431, entitled "System and Method for Selective Synchronization", which claims the benefit of priority under 35 U.S.C. § 119(e) to U.S. Provisional Patent Application No. 62/514,221 filed Jun. 2, 2017, entitled "System and Method for Selective Synchronization", which are hereby fully incorporated by reference herein.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of content management. More specifically, the disclosure relates to a system and method to enable users to selectively synchronize locally accessible content with a remote repository.

BACKGROUND

With the ever increasing prevalence and proliferation of electronic content has come a commensurate need for the management of such content. Content management systems do just that, allowing for the management of such content by controlling the access, editing, updating, versioning, etc. of content. This type of content management is in no way trivial. In certain contexts, such as in an enterprise setting, there may be millions or even billions of documents that need to be managed, and users may desire to have access to these documents from a variety of distributed access points.

To facilitate content management in conjunction with such distributed access, content management systems may be organized around one or more content management servers that provide services associated with the management of such content. Content management servers like these may be deployed in the cloud or otherwise distributed.

Using such content management systems then, users may access managed content to, for example, edit such content. To access such content users typically use a user interface (UI) to interface with a content management server of the content management system. They reserve (or "check out") the content and download it locally on their computer (e.g., referred to as a client). The user can then edit the document, save the changed version to the content management server and un-reserve the content.

Some systems require the installation of specialized drivers to intercept calls between editing applications and the operating system. When a user selects the file that he/she wants to edit (e.g., by double clicking on the asset), the file can be retrieved from a data store and opened locally with whichever program is associated with that particular type of asset. The specialized drivers capture calls by the editing application and forward the calls to the remote server so that the various calls can be replayed at the remote server. These systems present shortcomings, however, because they require additional programming at the operating system "driver" level. Any defect or error in the program while the program is running can cause the local user's machine to cease functioning or "crash" until the operating system is reinitialized (e.g., until the client computer is rebooted), significantly reducing user productivity, and leading to loss of data. In addition to the problems mentioned above, these systems present issues when there are communication problems, etc. that may cause some of the calls to be missed by the server.

Some online file storage systems rely on a desktop synchronization application installed on the client device to synchronize files between the client device and a content management server. Typically, the desktop synchronization application is configured to synchronize a highest level folder and all subfolders and files. However, there are cases in which a user may want to sync some subset of related files, but not other related files. For example, a user may have a mix of large and small files in a project folder stored on a remote content management system, but may only wish to sync the smaller files to his or her client computer. With conventional solutions, the user must create separate folders on the remote content management system for the large and small files and ensure that the folder containing the larger files is not in the folder hierarchy under folder containing the small files. Furthermore, if the user decides that a file that was being synchronized should no longer be synced, the user must change the folder/file hierarchy at the remote content management system to move the file to a folder that is not being synched.

SUMMARY

Embodiments of the present invention provide systems and methods to synchronize locally accessible content with a remote repository. One embodiment of a system comprises a client computer and a remote content management system. The client computer comprises a synchronization manager that communicates with the remote content management system to determine a set of objects in a content navigation hierarchy. The synchronization manager further provides a user interface with controls to allow a user to independently select multiple objects in the content navigation hierarchy for synchronization. The synchronization manager receives an input, via the interface, the input selecting objects for synchronization from the set of objects. The synchronization manager stores local peers of the selected objects in a local cache in a local file system and synchronizes changes to the selected objects at the content management system to the local peers of the selected objects. The synchronization manager can also synchronize changes to the local peers to the objects at content management system.

The synchronization manager, according to one embodiment, maintains a remote virtual model that models a synchronization state of the selected objects at the content management system and a local virtual model that models a synchronization state of the local peers of the selected objects in the local file system. The synchronization manager determines that the remote peer object and local peer object are out of sync based on a comparison of the remote virtual model and the local virtual model synchronizes. The synchronization manager can synchronize changes from the local cache to the content management system to update the remote peer object or changes from the content management system to update the local peer object. The synchronization manager may also maintain a selective synchronization model that models synchronization selections. The synchronization manager can use the selective synchronization model to filter events. For example, the synchronization manager may block events from being synchronized to the local cache or allow events to be synchronized to the local cache based on the selective synchronization model.

Another embodiment of a system comprises a processor and a memory having stored thereon instructions executable by the processor. The instructions can be executable to communicate with a remote content management system to determine a set of objects in a content navigation hierarchy. According to one embodiment, the set of objects comprises files and folders. The instructions can be further executable to provide a user interface with controls to allow a user to independently select multiple objects in the content navigation hierarchy for synchronization. The instructions can thus be executable to receive an input, via the interface, the input selecting objects from the set of objects.

The user interface can combine hierarchy data from the content management system with user selections. The interface can be adapted to allow the user to independently select the multiple objects from different levels of the content navigation hierarchy or multiple objects from the same level of the content navigation hierarchy. The controls can allow a user to independently select the multiple objects as hard sync selections. The instructions can be further executable to automatically select, as a soft sync selection, a parent container object of a hard sync selected object.

The instructions are further executable to store local peers of the selected objects in a local cache in a local file system and synchronize changes to the selected objects at the content management system to the local peers of the selected objects. In addition or in the alternative, the instructions can be executable to synchronize changes to the local peers to the selected objects at the content management system.

According to one embodiment, the instructions are further executable to traverse the content navigation hierarchy to identify a set of additional container objects above each selected object in the content navigation hierarchy and create local peers of the additional container objects in the local file system. The local peers of the additional container objects and the local peers of the selected objects can be arranged in a local hierarchy that reflects at least a portion of the content navigation hierarchy. Changes to the additional container objects at the content management system to the local peers of the selected objects.

The instructions may be further executable to build a selective synchronization model including metadata for the selected objects and additional container objects, receive a notification from the content management system of an event associated with at least one object in the content navigation hierarchy and filter the notification based on the selective synchronization model.

The instructions, according to one embodiment, are executable to monitor the file system for events in the local cache, in response to an event in the local cache, determine that a file has been added to the local cache, upload the file to the content management system, receive a notification from the content management system to create the file in the local cache, determine that the file already exists in the local cache and based on determining that the file already exists in the local cache, select the file for synchronization.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DISCLOSURE

Figure 1:
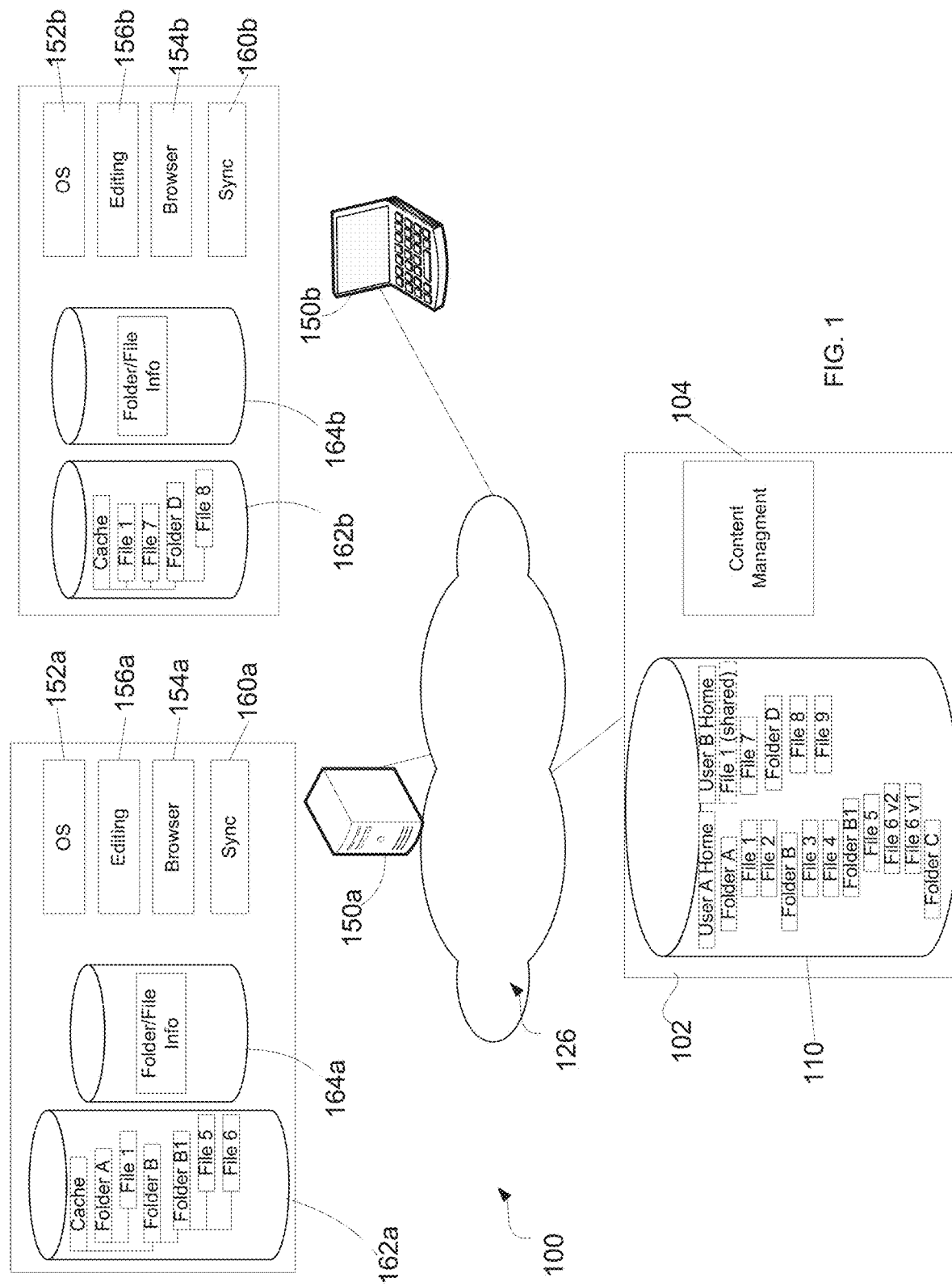
FIG. 1 is a block diagram depicting one embodiment of an environment in which synchronization may be implemented.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Embodiments of the present disclosure provide systems and methods to synchronize locally accessible content with a remote repository. In particular, certain embodiments include a content management system for managing data content stored on a remote content management server and a client computing device that can synchronize content between the content management server and the client device. The client computing device includes a synchronization manager that manages synchronization between the client computing device and the content management server. The synchronization manager is configured to selectively synchronize data resources between the client device and the content management server. Among other advantages and benefits, selective synchronization can allow a user to maintain synched and non-synched data resources together in the same container of a content navigation hierarchy.

The system enables the "seamless" use of tools of choice for editing files by synchronizing changes to files or folders in the local cache regardless of the application that made the changes. The system ensures that the user can always save files, and works with most existing applications installed on a client device. At the same time, the system preserves key capabilities of the content management server system. Generally, the system uses a seamless synchronization technique for uploading and downloading files. As described in detail below, client applications can edit files using standard file system paths to a local hard disk or roaming profile. Those file system paths directly access a local file cache, so that opening and saving of previously downloaded files can be fast and reliable. The local file system is monitored so that the system can determine when a file or folder content or metadata has been modified and should be uploaded to the content management server. The modified content and metadata can be uploaded in the background. Moreover, the latest version can be automatically downloaded from the content management server, if necessary. In one embodiment, an application in the client device system tray on the task bar provides an unobtrusive user interface (UI) for communicating with the user as necessary, such as to report on the status of pending operations.

Ease of access is another advantage provided by embodiments as disclosed herein. In some prior systems, users opened files for editing directly from a content management server and every time there was a save request, a synchronous save of the file to the content management server was required. In embodiments as presented herein, an architecture is provided where the user's client device maintains a local cache and such editing of files can be provided separately from a content management server for an enterprise containing the same files. Synchronization may be performed between the user's client device and the content management server asynchronously from a user saving the file.

In certain embodiments, the files in the local cache of the client device are synced to the content management server in the background while being maintained in the local cache. The system can employ a watcher to watch the cache to determine if the cache has changed and the system can determine if file or folder content or metadata should be synchronized with the server. By divorcing the editing and the synchronization processes through the use of the local cache, a seamless and speedy way to allow a user to access files that are synchronized with a server is provided. By providing a seamless way for a user to be able to access files for editing using a local cache instead of having the user edit them on a content management server located in a cloud and connected via an Internet connection, a user is not always required to have Internet connectivity and editing of files can be accomplished in speedier manner. Moreover, convenient functionality of applications may be used, such as most recently used (MRU) files list of Microsoft® Office applications (e.g., Word, Excel, or other applications).

The content management server may provide functionality, such as versioning, audit trails or other functionality not available in the local editing application. By synchronizing changes to the content management server versions can be preserved, audit trails created, etc. using the server's content management functionality. Furthermore, the content management server may provide collaboration tools to allow sharing of and collaboration with respect to files.

FIG. 1 is a block diagram of one embodiment of a system 100 for synchronizing content. System 100 includes a content management server 102 executing a content management module 104 to manage data resources (files, folders or other discrete sets of data) stored in data store 110, which may include one or more file systems, databases or other data stores to store managed items. According to one embodiment, content management server 102 may provide a cloud based file storage system that provides file synchronization across multiple devices, file sharing and other features.

Content management module 104 provides an Application Program Interface (API) or other interface to allow applications on client devices (e.g., client devices 150a, 150b) to access content. Client devices may access content from content management server 102 over a network 126, which may be a LAN, WAN, such as the Internet, or other network. Client devices may include a variety of device types including, but not limited to, personal computers, workstations, smart phones, laptop computers, or other computer devices operable to access data from content management server 102. While FIG. 1 shows only two client devices 150 and one content management server 102, it should be understood that a system may include any number of clients and content management servers.

Content management server 102 may manage files and folders (or other data resources) as set of objects. Data store 110 may thus provide an object-based data store in which files and folders (or other data resources) are managed as set of objects. The managed folders at content management server 102 may be "virtual" folders that do not correspond to actual file directory paths in a file system of data store 110. The files managed by content management system 102 may be files stored in a file system of data store 110, files stored in a database (e.g., as blobs), or sets of logically related data managed as file objects.

In one embodiment, each item (file, folder or other item) managed by content management server 102 is associated with content management metadata. The content management metadata may include an object identifier associated with each item managed by the content management server 102. In particular, in order to manage content in the content management system (e.g., as stored in data store 110) the content management module 104 may utilize one or more object identifiers, such as GUIDs to identify objects. In one embodiment, the content management module 104 may use a content management node identifier (node id) that can serve to identify a file or folder regardless of its location in a file system or version. In other words, there may be multiple stored versions of the same file and each of those versions would have the same content management node id to associate the different versions. Each of the versions would be managed as a distinct piece of content and to manage the different versions of the same file, there may be a different version number associated with each version. For example, as illustrated in the example of FIG. 1, File 6 v1 may be a first version of a file and File 6 v2 may be a second version of the file. Each of these versions may be stored separately but is associated with the same content management node id. Additionally, other metadata may be associated with each object such as the size of a file, a timestamp indicating a last save time, ids of related objects (for example, parent object ids or children object ids to relate folders and files in a hierarchy).

Accordingly, content management metadata may include metadata associated with a managed object. Content management metadata may contain enough information that the content management module 104 will be able to, for example, locate the managed object in data store 110 even in cases where the managed object has changed location on the file system or determine if an object is a latest or same version of that object, or perform other operations with respect to managed objects.

Content management module 104 may provide a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. The content navigation structure may or may not reflect an actual arrangement of files and folders in a file system of data store 110.

Content management module 104 provides user interface functionality for accessing items managed by content management server 102. The interface functionality may be provided through any suitable mechanism including, but not limited to, a web application server exposing a REST API or through another mechanism. Content management module 104 processes requests (e.g., commands) submitted via the interface by client applications running on client devices 150*a*, 150*b* to enable a user to perform various operations via a client application, such as uploading items, downloading items, reserving items, editing content, searching, adding items to containers, removing items from containers, adding containers, editing containers, removing containers and other operations. A user's ability to access particular items and perform particular operations may be limited based on permissions.

Each client device may include a variety of programs including, but not limited to, a respective operating system (e.g., operating systems) 152*a*, 152*b*, web browser (e.g., web browser 154*a*, 154*b*) and editing applications (e.g., editing applications 156*a*, 156*b*), such as a document editor, spreadsheet program, presentation editor or other application that can be used to edit a file. According to one embodiment, an editing application may be web app editing application provided via browser or a mobile app. In another embodiment, an editing application may be an application installed at the client device 150*a*, 150*b*. Each client device can further include a respective synchronization manager (e.g., synchronization manager 160*a*, 160*b*). The client devices may have different operating systems, web browsers, or editing applications installed. The synchronization manager 160*a*, 160*b* on each client device 150*a*, 150*b* executes in the corresponding operating system 152*a*, 152*b* to maintain a respective local cache 162*a*, 162*b* and synchronization management database 164*a*, 164*b*.

The local synchronization manager 160*a*, 160*b* at a client device 150*a*, 150*b* maintains a respective local cache 162*a*, 162*b* of files that are synchronized with server 102. Corresponding local and remote files and folders may be referred to as peer local and remote files or peer local and remote folders. File 1 stored on client device 150*a* and File 1 stored in data store 110 may be referred to as peer local and remote files. That is, File 1 stored in data store 110 is the remote peer of File 1 stored on local cache 162*a* of client device 150*a* and File 1 stored in the local cache 162*a* of client device 150*a* is the local peer of File 1 stored at data store 110 and so on. It can be noted that a local peer file and remote peer file may not be identical as the peer pair may be out of sync at any given time. Similarly, a local peer folder and remote peer folder may not be identical as the peer pair may be out of sync at any given time. In one embodiment, a local cache 162*a*, 162*b* may include files and folders arranged in a file system structures that reflect associations between objects on server 102 (files and folders). More particularly, a local cache 162*a*, 162*b* may be arranged in a hierarchy that reflects at least a portion of the content navigation structure provided by server 102.

A synchronization manager 160*a*, 160*b* may also maintain a respective synchronization management database 164*a*, 164*b* where management data associated with the management of content stored in a respective local cache 162*a*, 162*b* may be stored. The synchronization management database 164*a*, 164*b* may include data for modelling the respective local cache 162*a*, 162*b* and remote server objects to facilitate synchronization. In some embodiments, the synchronization management database 164*a*, 164*b* can be stored as one or more files in the local file system.

A synchronization manager (e.g., synchronization manger 160*a*, 160*b*) may be installed on the client device at the request of a user or, for example, when the user accesses content management module 104 using another interface. For example, in certain embodiments, content management module 104 may provide an interface that may be accessed using a web browser 154*a*, 154*b*. When a user at a client device 150*a*, 150*b* accesses this browser-based interface a module (e.g., including JavaScript or the like) may be executed or otherwise loaded on the client device (e.g., by the browser 154*a*, 154*b*). This module may determine if the synchronization manager is deployed on the client device 150*a*, 150*b*. If the local synchronization manager is not already installed on the client device 150*a*, 150*b*, the synchronization manager may be downloaded from content management server 102 and installed on client device 150*a*, 150*b*.

Additionally, the synchronization manger can determine if a local cache or synchronization management database exists on that client device. If not, the synchronization manager may create the local cache (e.g., local cache 162*a*, 162*b*). Local cache 162*a*, 162*b* may be a location (e.g., one or more folders) on the local file system of client device 150*a*, 150*b* provided by the local operating system 152*a*, 152*b*. In some embodiments the location of local cache 162*a*, 162*b* may be user specified, whereas in other embodiments the location of local cache 162*a*, 162*b* may be selected by synchronization manager 160*a*, 160*b*. The synchronization manager can also create a synchronization management database (e.g., synchronization management database 164*a*, 164*b*) where management data associated with the management of content in the respective local cache (e.g., respective local cache 162*a*, 162*b*) may be stored.

As will be discussed in more detail, each synchronization manager 160*a*, 160*b* includes one or more modules that communicate with one or more interfaces provided by content management module 104 on content management server 102 to allow the user at the client devices 150a, 150b to seamlessly access the content in data store 110 managed by the content management server 102. In particular, a user may attempt to access managed files in a variety of ways, including through the previously discussed web based interface or directly through an editing application, etc., though access to content may be restricted based on user credentials (e.g., username and password) and sharing permissions to provide both private storage (single user) and shared access to files. Each synchronization manager 160a, 160b can store login and authentication information such that the synchronization manager 160a, 160b can connect to server 102 without requiring the user to re-enter his/her login and/or authentication information. In the example of FIG. 1, synchronization manager 160a stores authentication information for "User A" and synchronization manager 160b store authentication information for "User B." The login and authentication information can include username and password, authentication tokens provided by an authentication authority to re-establish sessions or other credentials.

A synchronization manager 160a, 160b can download all the files managed by content management server 102 to which a respective user has access or can download selected files. In some embodiments, the synchronization manager 160a, 160b may provide a user interface that displays the files available to the respective user and request particular files from the content management server 102 in response to user input (e.g., user selection of files). In particular, a synchronization manager 160a, 160b can be user configurable to only synchronize some subset of files available to the respective user. For example, if a user has 100 files stored on content management server 102, the user may select to only automatically synchronize particular files or folders to reduce network usage.

In some cases, when a file is received from content management server 102, the synchronization manager 160a, 160b may further prompt the operating system 152a, 152b to open the cached file using the appropriate editing application 156a, 156b. Thus, for example, if .doc files are associated with a particular word processing editing application 156a at client device 150a and File 1 is a .doc file, synchronization manager 160a can prompt operating system 152a to open File 1 in the appropriate word processing application associated with the .doc extension.

In any event, synchronization managers 160a, 160b can determine if selected server stored files are in the respective local cache 162a, 162b. If not, a file may be requested from content management module 104 on content management server 102. In certain embodiments, even if the requested file exists in the local cache 162a, 162b, identifying information for the file may be sent to content management module 104 to determine if the version of the content stored in the local cache 162a, 162b is the most recent version. The content management module 104 may reply with metadata for the server stored copy of the file (e.g., object id, version number, last modified date). If the cached copy of the file is not the most recent version, the synchronization manager 160a, 160b can download the latest version from server 102 and store the latest version in the local cache 162a, 162b.

In the embodiment of FIG. 1, content management server 102 maintains a set of folder objects and file objects for "User A" and "User B." The "Home" object represents a user's entry point into content management module 104. The entry point for a user may be a container corresponding to highest level in a navigation hierarchy to which the user has access or some other default location in the hierarchy. From there, the user may navigate to decedent containers (e.g., folders) and files. Using synchronization manager 160a, 160b, the user may select files and folders available via content management server 102 to synchronize with the local cache 162a, 162a. For example, User A can use synchronization manager 160a to navigate the content management structure of folders and files managed by server 102 that are available to User A and select the files and folder to synchronize with local cache 162a. Similarly, User B can use synchronization manager 160a to navigate the content management structure of folders and files managed by server 102 that are available to User A and select the files and folder to synchronize with local cache 162a.

Figure 2A:
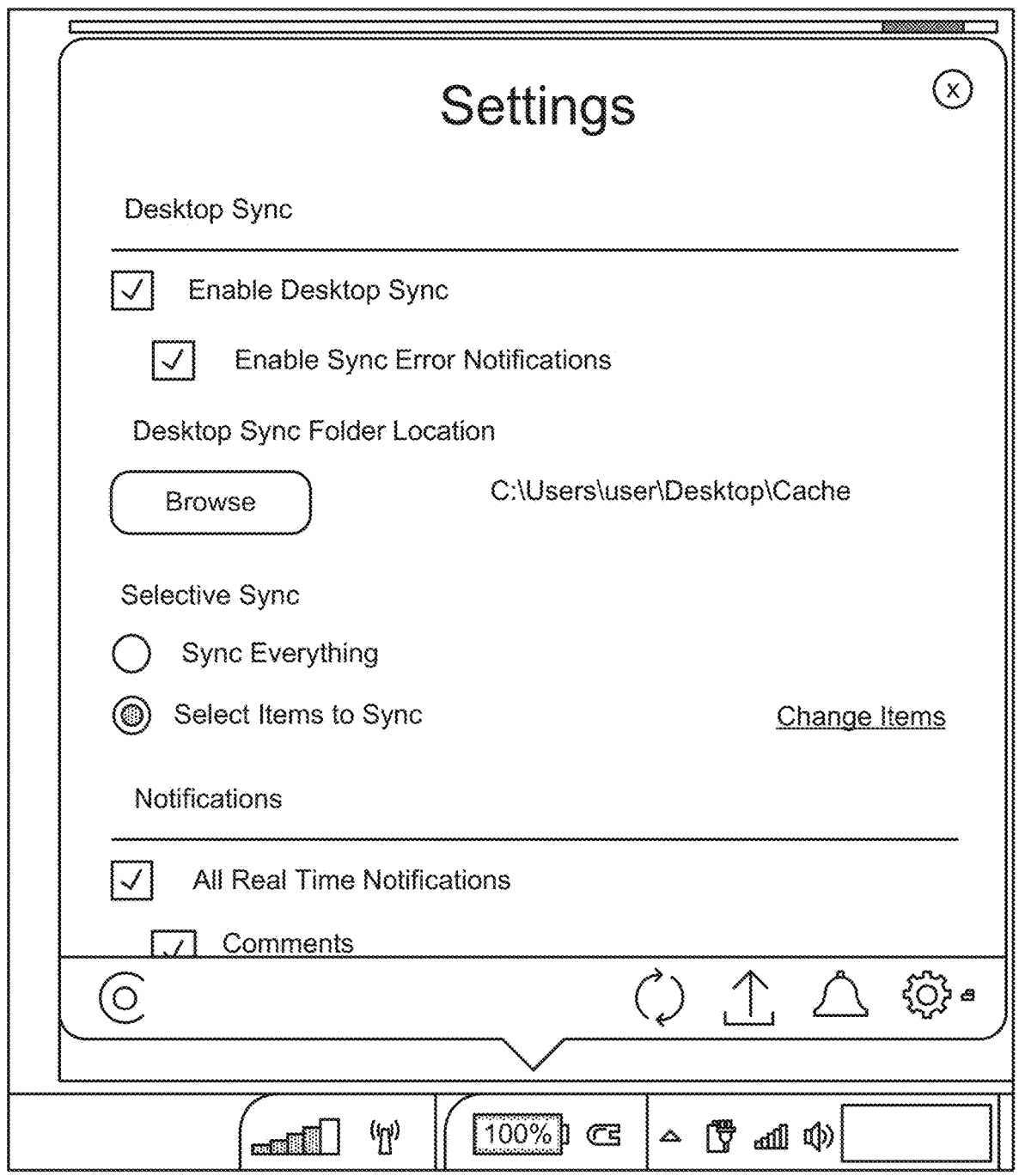
FIG. 2A and FIG. 2B are diagrammatic representations of one embodiment of a synchronization interface.

FIG. 2A illustrates, for example, a user interface presented by a synchronization manager (e.g., synchronization manager 160a on client device 150a) that allows a user to select whether to "sync everything" (all files and folders associated with the user by content management module 104) or "select items to sync." If the user selects "sync everything" synchronization may occur as described, for example, in U.S. patent application Ser. No. 15/824,639, entitled "System and Method for Content Synchronization," filed Nov. 28, 2017 (the "Synchronization Application"), which is hereby fully incorporated by reference herein for all purposes or U.S. Provisional Patent Application No. 62/426,987, entitled "System and Method for File Synchronization," by Jewell et al., filed Nov. 28, 2016, which is hereby fully incorporated by reference herein for all purposes.

Figure 2B:
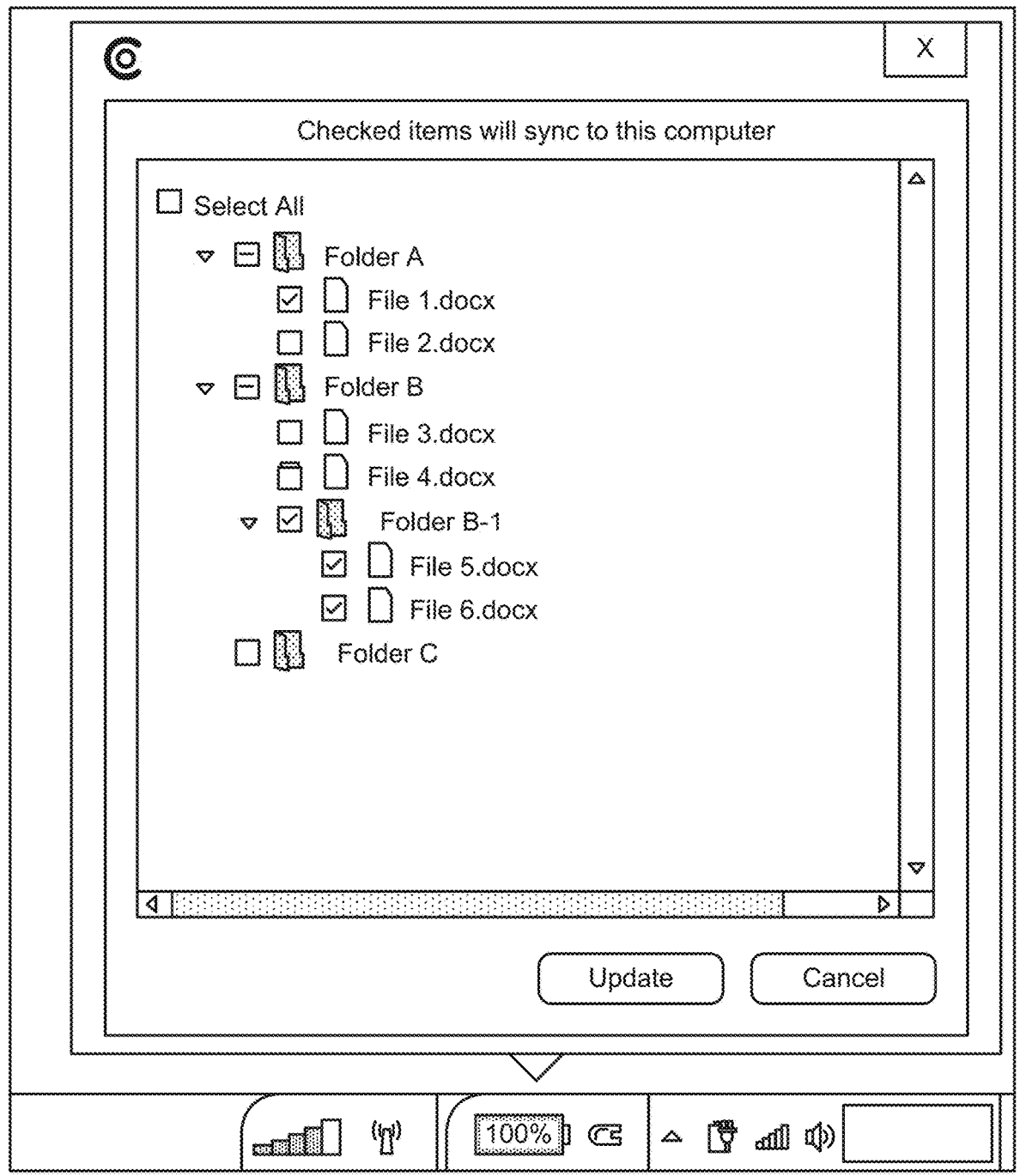

On the other hand, if the user selects "select items to sync", the synchronization manager can provide an interface to allow the user to select which files and folders to synchronize. The interface allows the user to independently select multiple objects in the content navigation hierarchy for synchronization. The user may select objects at the same level of the hierarchy or objects at different levels of the hierarchy for synchronization. Further, the user can select objects for synchronization such that a container includes both synchronized and non-synchronized objects. FIG. 2B, for example, illustrates one embodiment of a selective synchronization user interface. In this example, the synchronization manger (e.g., synchronization manager 160a) provides a representation of the content navigation structure of folders and files associated with User A and input controls to allow User A to select which files/folders to synchronize. In the example of FIG. 2B, files and folders are designated as "no sync" (Folder C) (empty checkbox), hard sync selections (File 1, Folder B-1, File 5, File 6) (designated by a checkmark) or soft sync selections (Folder A, Folder B) (designated by "-" in the checkbox).

Files and folders may be explicitly (hard) or implicitly (soft) selected for synchronization based on user inputs. If a user explicitly selects to synchronize a file or folder (e.g., by checking on a check box in FIG. 2B), the file or folder can be designated as a hard sync selection. Based on receiving a hard sync selection, the synchronization manager traverses the hierarchy above a file or folder for which a hard selection was marked and designates folders above the file or folder in the hierarchy for synchronization via soft selection (if the ancestor folder has not already been selected as a hard sync selection). In FIG. 2B, for example, the hard selection of File 1 results in the soft selection of Folder A.

If the user explicitly selects to synchronize a folder, the selection of the folder is processed as a hard sync selection for the folder and any folders and files below that folder in the hierarchy, including folders that were previously designated as no sync or soft sync selections, are designated as hard sync selections. Thus, if the user checks a parent folder, all of its descendant folders and files will be automatically checked. For example, selecting Folder B-1 in FIG. 2B results in the hard sync selection of Folder B-1, File 5 and File 6. As described above, the synchronization manager also traverses the hierarchy above a folder or file for which a hard selection was marked and designates folders above as soft sync selections (if not already hard sync selected). Thus, if the user checks a child folder, all of its ancestor folders that are not already checked will be automatically soft selected. In FIG. 2B, for example, the hard sync selection for Folder B-1 results in the soft sync selection of Folder B. If the user unchecks a parent folder, all of its descendant folders and files may be automatically unchecked.

The user may select items to exclude. If items in the hierarchy below a folder designated as hard sync selected are changed to no sync, the folder may be categorized as a soft sync selection. Using the example of FIG. 2B, if the user removes File 6 from synchronization (e.g., by unchecking the box next to File 6 in the UI), Folder B-1 can be changed to a soft sync selection.

The hard sync, soft sync and no sync designations can affect certain synchronization processes. For example, according to one embodiment:

1) If the folder is designated as no sync, the folder and any items below the folder in content navigation hierarchy will not be synchronized to the client computer. For example, folders that are unchecked in FIG. 2B (e.g., Folder C and any decedent folders and files) will not sync down the user's hard drive.

2) If a folder is designated as a soft sync selection, a corresponding local folder will be maintained in the local cache, but items below the folder at server 102 may or may not be synchronized to the local cache based on the synchronization selections associated with those items. For example, for soft-checked folders of FIG. 2B (e.g., Folder A, Folder B), the synchronization manager will only sync down the children selected for synchronization.

3) For a folder that is designated as a hard sync selection, a corresponding local folder will be maintained in the local cache and all items below that folder in the content navigation hierarchy will be synchronized to the local cache. For example, for hard-checked folders of FIG. 2B (e.g., Folder B-1), the synchronization manager will sync down all of its contents.

While the foregoing example allows for the explicit selection of files or folder, other embodiments may only provide for the hard selection of folders for synchronization. In such an embodiment, all the dependents of a selected folder may be synchronized to the client computer. In another embodiment, the synchronization manager only provide for the hard selection of files, but not folders.

Returning to FIG. 1, the identities of objects marked for synchronization can be stored in a respective selective synchronization data structure in a synchronization management database 164a, 164b. In some cases, only the ids for objects that are hard sync selected are stored in the selective synchronization data structure, while the identities other objects that will be synchronized can be derived from the content management hierarchy. According to one embodiment, the settings the user previously saved with the checkboxes in the selective sync settings may be maintained if the user changes from "select items to sync" to "sync everything" (e.g., via the interface of FIG. 2A) so that the user can automatically return to his or her previous settings if the user changes back to "select items to sync".

The selective sync settings can be client device specific. In other words, if user has multiple machines running synchronization managers, the user can have different selective sync settings on each machine even if user only has one account on the content management system that the user uses on all of the machines. In other embodiments, the server 102 may maintain the selective sync setting for a user account so that the selective sync settings can be preserved across multiple client devices. In one embodiment, for example, cache manager 160a may send the selective sync settings to server 102 (e.g., when the settings are initially set, when changed or at the occurrence of other predefined events) and the server 102 can distribute the settings to each synchronization manager associated with the same account.

Each local cache 162a, 162b may include a top level folder under which items selected for synchronization are organized. For example, the local cache 162a and local cache 162b include a top level folder "cache." With respect to local cache 162a and using the selections shown in FIG. 2B, synchronization manager 160a creates peer local folders Folder A, Folder B and Folder B-1 in local cache 162a and downloads files File 1, File 5 and File 6 to the appropriate locations. Thus, the local hierarchy of files and folders in the cache can reflects at least a portion the content navigation hierarchy provided by server 102 for selected files and folders. Similarly, based on selections in a UI provided by synchronization manager 160b, synchronization manager can create peer local folder D and download files File 1, File 7 and File 8 to the appropriate locations in local cache 162b.

The synchronization manager maintains synchronization management information for accessed items. In the example of FIG. 1, synchronization manager 160a maintains synchronization management information for Folders A, B, B-1 and files File 1, File 5 and File 6 in synchronization management database 164a of client device 150a, while synchronization manager 160b maintains synchronization management information for File 1, File 7, Folder D and File 8 in synchronization management database 164b of client device 150b.

A user may access and edit a local copy of content through an editing application (e.g., editing application 156a, 156b), change the structure of the cache by adding/removing folders or take other actions that change the cache. For example, if File 1 is a word processing document, a user may edit File 1 using a word processing editing application 156a in the same manner he or she would use the word processing application to edit other word processing documents. As the user makes changes to the file, such changes can be saved to the local copy of the file (the local peer file) stored in local cache. In other words, the changes by the editing application are stored to the local file system where the local cache storing the files resides. Changes to items in the local cache 162a, 162b (e.g., creation, deletion, editing of files and folders) may be detected by the respective synchronization manager 160a, 160b and synchronized to server 102.

To determine when changes are made to local cache 162a, 162b, the respective synchronization manager 160a, 160b may monitor local cache 162a, 162b. According to one embodiment, an application may register with an operating system for automatic file or directory change notifications or other event notifications. For example, various versions of the WINDOWS Operating System by MICROSOFT CORP of Redmond, Wash., USA, support registering for file and directory change notifications and other event notifications and, as would be appreciated by those of skill in the art, other operating systems also support registering for event notifications. Therefore, in some cases, the synchronization manager may take advantage of this feature and register for automatic event notifications for the directories (folders) of the local cache. For example, synchronization manager 160*a* can register for event notifications on a directory after creating the directory in local cache 162*a* and synchronization manager 160*b* can register for event notifications on a directory after creating the directory in local cache 162*b*. If the synchronization manager 160*a*, 160*b* receives an automatic event notification for a directory, the synchronization manager 160*a*, 160*b* can request metadata from the operating system 152*a*, 152*b* for the folders and files in the local cache 162*a*, 162*b* and determine which folders or files have changed. The determination may be based, for example, on modified dates for a folder or file, changes in folder or file size, changes to a data hash of the file or folder or other changes.

A synchronization manager may also register for automatic event notifications with respect to individual files in the local cache. For example, synchronization manger 160*a* can be configured to register for notifications with respect to a file after saving the file to the local cache 162*a* and synchronization manger 160*b* can be configured to register for notifications with respect to a file after saving the file to the local cache 162*b*. If the synchronization manager 160*a*, 160*b* receives an automatic event notification for a particular file (such as a change notification), the synchronization manager 160*a*, 160*b* may determine that the file has changed based on the notification itself. In another embodiment, synchronization manager may determine that the file has changed in response to the automatic notification by requesting metadata for the file from operating system 152*a*, 152*b* and compare the received metadata to previous metadata for the file (e.g., to determine that the file has changed based, for example, on modified dates for the file, changes in file size, or other changes in file system metadata). The synchronization manager 160*a*, 160*b* may confirm that the content of a file has changed by comparing a current hash of a file to a previous hash of the file.

In another embodiment, synchronization manager 160*a*, 160*b* may poll the respective operating system 152*a*, 152*b* for file system metadata and make a determination that a folder or file has changed based on file system metadata. Polling can be done, for example, by reading a time stamp associated with a cached file to determine the last time at which the cached file was modified. If the time stamp from the most recent polling of a cached file does not match the time stamp from a previous polling of a cached file then the synchronization manager 160*a*, 160*b* can determine that the cached file has been modified and can attempt to synchronize the cached file with content management server 102. As another example, the synchronization manager 160*a*, 160*b* may poll file system metadata of a cached file to determine that a lock has been released, indicating that another application has released the file, and based on the lock being released, determine if the file has changed. Again, the determination that the file has changed may further include comparing last modified dates, hashes or other information.

As can be understood by those of ordinary skill in the art, the frequency at which synchronization manager polls cached files can be adjusted to optimize the resources of the client device. A more frequent polling will require more resources but will result in a lower latency between the time when a cached file is modified and when the synchronization manager determines that a cached file has been modified. Conversely, a longer time interval between each polling of a cached file will reduce the required resources of the client device but can lead to a longer latency period. Thus, the polling interval can be set to optimize system resources with respect to latency period.

In some embodiments, synchronization managers 160*a*, 160*b* may use a combination of automatic event notifications and polling to determine that a file has changed. Regardless of whether the synchronization manager 160*a*, 160*b* is notified of events through automatic notifications, polling or other mechanism, when synchronization manager 160*a*, 160*b* determines that an event that requires synchronization has occurred in local cache 162*a*, 162*b* (e.g., a file or directory has changed), synchronization manager 160*a*, 160*b* may formulate and send one or more requests to content management module 104 to update corresponding items at content management server 102. Synchronization manager 160*a*, 160*b* may synchronize changes to the respect local cache 162*a*, 162*b* to server 102 by sending a copy of the entire file, copies of the changed blocks, a range of blocks or metadata that contain a change to server 102.

Content management module 104 may receive the request and perform the requested update. In some embodiments, content management module 104 may update a remote peer copy of file by creating new version of the file each time an update to the file is received. For example, if a user at client device 150*a* edits File 1 in local cache 162*a* and synchronization manager 160*a* uploads the changes to content management server 102, content management module 104 can update the remote peer File 1 by creating a new version of File 1 (e.g., version 1.1) while also retaining the previous version. In other embodiments, content management module 104 may update the remote peer File 1 by overwriting the previous version of File 1.

Synchronization may be bi-directional. Content management module 104 may send event notifications to synchronization managers 160*a*, 160*b* (automatically or in response to requests) to alert synchronization managers 160*a*, 160*b* of changes to peer remote folders or files. For example, if a user at client device 150*b* edits shared File 1 and synchronization manager 160*b* synchronizes File 1 to content management server 102, then local peer File 1 in synchronization cache 162*a* of client device 150*a* may be out of date because the remote peer File 1 has been edited/replaced with a new version. Content management module 104 can notify synchronization manager 160*a* of a change to remote peer File 1 and synchronization manager 160*a* can download the updated File 1 (or changes to File 1). The local peer File 1 in cache 162*a* can be updated by replacing File 1 with the most recently downloaded version, modifying File 1 or otherwise updating the local peer File 1 to synchronize the locally cached File 1 with the server.

As discussed above, a user may select which files to synchronize between server 102 and a local cache. According to one embodiment, the synchronization manager at the client controls selective synchronization and the content management module 104 does not have knowledge of the synchronization selections. Content management module 104 may process events as if all items associated with a user are synchronized with the user's client device. The synchronization manager at the client device can filter out and modify messages from content management module 104 to facilitate selective synchronization.

For convenience, content management module 104 may provide a locking mechanism so that a user can lock a file. Synchronization managers 160*a*, 160*b* that are managing a peer local copy of a file that is locked may be sent a notification so that the respective user can be notified that another user is editing the file. Such a scheme can help avoid conflicts that occur when multiple users update local peer copies of a file simultaneously. However, synchronization managers 160a, 160b can also include conflict detection and resolution mechanisms.

In accordance with one aspect of the present disclosure, content management server 102 may provide a hosted website component including data storage in which a plurality of data resources (files, folders and other resources) are collectively associated with a website. Content management module 104 may make the plurality of data resources available as a website accessible over a global network. Synchronization manager 160 can synchronize resources (e.g., files, folders or other resources) with server 102 such that changes to a cached file result in a change to the website. In some embodiments, a change to the cache structure (e.g., adding/removing folders, renaming folders) may also result in a change to the website.

In some implementations, the "local cache" may be stored in a directory that is also synchronized to another system (for example another cloud-based file store system). The synchronization manager may, therefore, have the effect of synchronizing a file between the client and multiple servers and potentially multiple cloud-based services.

Figure 3:
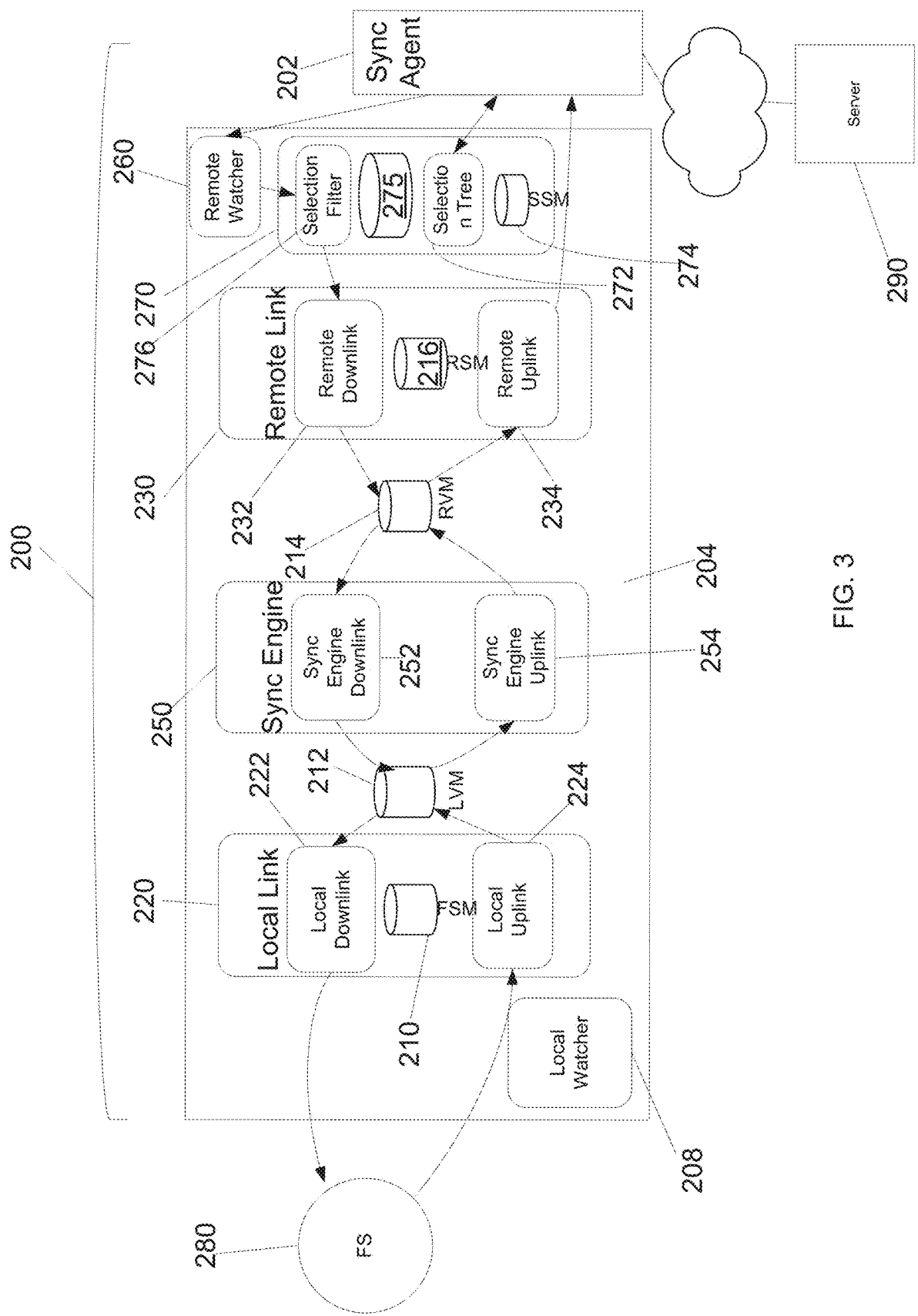
FIG. 3 is a diagrammatic representation of one embodiment of a synchronization manager.

FIG. 3 is a diagrammatic representation of one embodiment of a synchronization manager 200, which can be an example of a synchronization manager 160a, 160b. Synchronization manager 200 synchronizes changes between a file system 280 (e.g., such as a file system in which a local cache resides) and a remote server 290 running a content management application (e.g., such as content management server 102 running content management module 104). In accordance with one embodiment, synchronization manager 200 may be installed on a client device and may reside entirely in user space (rather than requiring installation of kernel components or customized drivers). Furthermore, synchronization manager 200, in one embodiment, may be a non-intercepting synchronization manager that does not intercept calls between editing applications and the file system, but instead, monitors the file system for changes. In other embodiments, synchronization manager may include drivers that intercept calls between editing applications and the file system.

Synchronization manager 200 includes a sync agent 202 and a synchronization manager sync engine module 204. In one implementation, the sync agent 202 includes a system tray application that runs in the background and appears in the client device system tray on the task bar to provide an unobtrusive user interface (UI) for communicating with the user as necessary, such as to report on the status of pending operations. The sync agent 202 can be responsible for communication with server 290. To this end, sync agent 202 can store information to log on server 290 under a user account and retrieve information related to objects (e.g., folders and files) associated with that account.

Synchronization manager 200 may use a number of models to facilitate synchronization. In the illustrated embodiment, synchronization manager utilizes a file system model (FSM) 210, local virtual model (LVM) 212, remote virtual model (RVM) 214, remote server model (RSM) 216, selective synchronization model (SSM) 274 and selective synchronization node model 275. Synchronization manager 200 stores the LVM 212, RVM 214 and SSM 274 to persistent storage (e.g., disk) periodically and/or when synchronization manager 200 closes. The LVM 212, RVM 214, SSM 274 and other models can be used to synchronize the remote server and local cache at startup of synchronization manager 200 and during ongoing operation.

Synchronization manager sync engine module 204, which may also run in the background, utilizes one or more data models that model local peer files and folders in the file system 280 and the remote peer folders and files at server 290. In the embodiment illustrated, these models include a local virtual model ("LVM") 212 that models the synchronization state of objects in the local cache (e.g., folders or files in file system 280) and a remote virtual model ("RVM") 214 that models the synchronization state of objects (folder or file objects) on remote server 290 that have been selected for synchronization. The synchronization state modelled in LVM 212 reflects the current state of file system 280 (most recent state known to synchronization manager sync engine module 204) for files or folders that are up to date or a stale state for files, folders and metadata to be updated in file system 280 to synchronize file system 280 with server 290. The synchronization state modelled in RVM 214 reflects the current state of server 290 (most recent state known to synchronization manager sync engine module 204) for files and folders that are up to date or a stale state for files, folders or metadata that should be updated at server 290 to synchronize server 290 with the local cache. Information for data models may be maintained in a database (e.g., a synchronization management database 164a, 164b of FIG. 1) and the data models may be maintained in transient memory during operation. According to one embodiment, synchronization manager 200 stores the LVM 212 and RVM 214 to persistent storage (e.g., disk) periodically and/or when synchronization manager 200 closes.

Also shown are a file system model (FSM) 210 and remote server model (RSM) 216. FSM 210 is an internal representation of a file or folder generated from several data sources including the file system. RSM 216 is based on the model provided by the remote system 290, but configured to allow easy comparison with the RVM 214. In some cases, RSM 216 is populated with data from selective synchronization module 270.

Selective synchronization module 270 further maintains a selective sync model (SSM) 274 that stores information on files or folders selected for synchronization. SSM 274 is used to build an a selective synchronization node model 275 that is used to at startup and during ongoing operation to synchronize files and folder from server 290 to file system 280. According to one embodiment, synchronization manager 200 stores SSM 274 to persistent storage (e.g., disk) periodically and/or when synchronization manager 200 closes.

Synchronization manager sync engine module 204 includes local link services 220 that keep LVM 212 and file system 280 in sync. Local link services 220 include a local downlink module 222 and a local uplink module 224. Local uplink module 224 updates LVM 212 to reflect the current state of file system 280. Local downlink module 222, on the other hand, performs operations on file system 280 to update file system 280 when the synchronization state modelled by LVM 212 for a file or folder is stale.

Synchronization manager sync engine module 204 further includes remote link services 230 that keep RVM 214 and remote server 290 in sync. Remote link services include a remote downlink module 232 and a remote uplink module 234. Remote downlink module 232 updates RVM 214 to reflect the current state of remote server 290 and remote uplink module 234 communicates with remote server 290 to update remote server 290 when the synchronization state modelled by RVM 214 for a file or folder is stale.

Sync engine 250 includes a sync engine downlink module 252 and a sync engine uplink module. Sync engine downlink module 252 acts as a peer router that, in response to a change in RVM 214 that reflects a change in a folder or file at server 290, determines the peer local folder or file in the local cache, and changes the synchronization state of the LVM 212 to stale. To update LVM 212, sync engine downlink module 252 compares RVM 214 to LVM 212 to determine if changes made at remote server 290 should be synchronized down to the peer local file or folder in file system 280 and updates that state of LVM 212 accordingly. Sync engine uplink module 254, on the other hand, acts as a peer router that, in response to a change to a folder or file in the local cache, determines the peer remote folder or file on server 290 and updates RVM 214 to flag the synchronization state for that file or folder as stale. To update RVM 214, sync engine uplink module 254 compares RVM 214 to LVM 212 to determine if changes made in the local cache should be synchronized to the peer remote folder or file on server 290 and updates RVM 214 accordingly.

Synchronization manager sync engine module 204 further includes a selective sync module 270 that controls selective synchronization of folders or files. Selective sync module 270 stores hard and soft selections of files and folders in SSM 274. SSM 274, according to one embodiment, specifies a tree of nodes corresponding to the files and folders selected for synchronization and the folders above each file or folder selected for synchronization. The SSM 274 may specify whether each node was hard selected or soft selected for synchronization. According to one embodiment, SSM 274 includes, for each file or folder, a node_id of the hard/soft selected nodes (e.g., an id such as an id 344 or other id to identify a file or folder to be synchronized) with an additional "node_type" that specifies whether the file or folder was hard selected or soft selected. For example, the node_types can be "RemoteSelectedFolder" for a hard selected folder, "RemoteSelectedFile" for a hard selected file and "RemoteSoftSelectedFolder" for a soft selected folder. SSM 274, according to one embodiment, may be maintained as a local, on-disk representation of sync selections.

Selective sync module 270 communicates with server 290 (via sync agent 202, which may log in to server 290 on behalf of a user) to collect information on the objects corresponding to the object identifiers stored in SSM 274. The information returned by server 290 may include parent-child relationships for the objects. Selective sync module 270 may thus use SSM 274 and information returned by server 290 to walk the content navigation hierarchy of files and folders accessible to a user and build an in-memory selective synchronization node model 275 (e.g., a selection tree model). At startup, for example, selection tree module 272 uses SSM 274 to determine which files and folders to synchronize, requests additional information from server 290 for the files and folders and builds the in-memory selective sync node model 275 of files and folders selected for hard/soft synchronization. The in-memory selective sync node model 275 may include all or selected portions of the information illustrated in remote virtual model (RVM) 314 below with the addition of the node_type. The node_type is used to process different types of operations. Remote downlink module 232 compares the files and folders in selective synchronization node model 275 to RVM 314 and creates, updates or deletes entries from RVM 314 as appropriate. The changes to RVM 314 are processed to update the local cache as discussed below.

Selective sync module 270 and sync agent 202 cooperate to provide a selective synchronization UI to allow the user to select which items to synchronize between server 290 and file system 280. The selective synchronization UI presented by synchronization manager 200 can combine live hierarchy data from server 290 with live selection from the user. According to one embodiment, when a user calls up the selective synchronization UI (e.g., calls up the UI illustrated in FIG. 2B), sync agent 202 communicates with server 290 to generate a representation of the content navigation structure provided by server 290 for objects associated with the user. In FIG. 2B, the selective synchronization UI presents the content navigation structure of folders and files associated with User A and input controls to allow User A to select which files/folders to synchronize. Further, selective sync module 270 provides sync agent 202 data from the SSM 274 that can be used to populate the UI. For example, if the SSM 274 is empty, sync agent can generate the representation of the content management structure indicating that none (or all) the files and folders associated with the user are selected for synchronization. If, on the other hand, the SSM 274 includes hard or soft sync selections, selective sync module 270 passes the selections (e.g., object ids and node types) to sync agent 202 and sync agent 202 populates the UI accordingly. For example, the next time a user calls up the selective synchronization UI after making the selections illustrated in FIG. 2B, the sync agent can build the tree illustrated using information from server 290 and, using the information from selective sync module 270, visually designate items as hard sync selections (represented by checkmarks), soft sync selections (represented by "-") or no sync (empty checkbox).

Based on the selections made using the selective synchronization UI, sync agent 202 communicates with selection tree module 272 to store a list of objects selected for synchronization in SSM 274. If the user changes the sync selections at run time, sync agent 202 can pass the updated sync selections to selection tree module 272 to update SSM 274 accordingly. Updating SSM 274 may include collecting information about additional nodes from remote server 290. Selective sync module 270 monitors SSM 274 for changes and generates events to remote downlink module 232 to create nodes or delete nodes from RVM 214 based on changes to SSM 274.

For example, if a user selects to synchronize a file or folder that was not previously synchronized, sync agent 202 can pass the unique identifier for this file or folder to selective sync module 270, which adds this file or folder to SSM 274. Once added, selection tree module 272 retrieves additional object metadata from the remote server 290 (via sync agent 202), adding the file or folder to its in-memory selective synchronization node model 275 and triggering an object creation event on remote downlink module 232. Remote downlink module 232 updates RVM 214 with an entry for the file or folder. As discussed below, the update to RVM 214 will cause the appropriate folder to be created in or file to be downloaded to the local cache in file system 280.

As another example, if a user selects to no longer synchronize an item, sync agent 202 can pass the unique identifier for the item to selective sync module 270, which removes the item from SSM 274. Once removed, selection tree module 272 removes the item from its in-memory selective synchronization node model 275 and triggers a delete event on remote downlink module 232, causing the item to be deleted from RVM 214. As discussed above, if the user selects to change a folder from synchronized to no sync, all the subfolders and files can be designated as no sync as well. Thus, sync agent 202 can pass the ids of the subfolders and files as well. The subfolders and files can also be removed from SSM 274 and model 275. Selective sync module 270 can further trigger delete events on remote downlink module 232 to delete the sub folders and files from RVM 214. As discussed below, the changes to RVM 214 will cause the appropriate folders or files to be deleted from file system 280.

If the user wishes to no longer synchronize a folder but still wishes for some of its contents to be synchronized, the user may remove selection from the folder and explicitly select the contents to be synchronized. Based on this input, sync agent 202 can pass unique identifiers (e.g., node_ids) for all selected items along with the identifier for the folder to selective sync module 270, which adds and removes the appropriate items from SSM 274 with the appropriate node_types designated. Selection tree module 272 then removes the folder from its in-memory selective synchronization node model 275 and adds the newly selected items to the selective synchronization node model 275, which may include adding the folder back as a soft selected folder. For any contents of the folder no longer selected for synchronization (either hard or soft), selection tree module 272 then triggers delete events on remote downlink module 232 to remove them from the RVM 214.

Events that occur at server 290 with respect to objects associated with a user account may require synchronization to file system 280. In ongoing operation, sync engine module 204 can monitor remote server 290 for changes to the files or folders synchronized by synchronization manager 200. To this end, synchronization manager sync engine module 204 includes a remote watcher 260 that detects events at remote server 290, such as events to create, delete or update objects accessible by a user. According to one embodiment, when an action is taken on a file or folder at remote server 290 with respect to an object associated with the user account for which synchronization manager 200 authenticated (e.g., a synchronized file or folder is updated, a file or folder is added to the synchronized folder, a synchronized file or folder is deleted), remote server 290 sends an event notification to sync agent 202 and sync agent 202 passes the notification to remote watcher 260. The event notification can identify the event and object affected by the event. Thus, remote watcher 260 can be configured to listen for events from sync agent 202 (or otherwise listen for or receive notifications from server 290 of a change to a file or folder, including a change on the file or folder metadata). In another embodiment of monitoring remote server 290, remote watcher 260 may poll sync agent 202 for event notifications and sync agent 202 can, in turn, poll remote server 290 for event notifications.

If remote watcher 260 detects an event that may require synchronization and selective sync is not enabled, remote watcher triggers an event on downlink module 232. With selective sync enabled, selection filter 276 filters events from remote watcher 260 (e.g., to block or allow triggering downlink module 232). According to one embodiment, selection filter 276 accesses selective synchronization node model 275, which may be maintained in memory, to determine if an event affects an object contained in the selection tree model. Selection filter 276 filters out events that do not involve any file or folder selected for synchronization. Note that, in this case, sync agent 202 still receives the notification from server 290 so that the user may be notified of the event through the UI provided by sync agent 202, but the notification does not trigger remote downlink module 232.

If selection filter 276 determines that an event does affect a file or folder contained in the selective synchronization node model 275, selection filter 276 applies rules to filter out the event, trigger remote downlink module 232 or take another action. The rules may depend on the type of event, the object(s) affected and other factors. The following provides some example filtering rules. These rules are provided for illustrative purposes and not limitation.

For an event that involves only files or folders hard selected for synchronization—that is, files or folders designated as hard sync selections in selective synchronization node model 275—filter 276 can pass the event from remote watcher 260 to remote downlink module 232.

If the notification is for a create event to create an object (file or folder) in a hard sync selected folder, selection filter 276 checks the RVM 214 to determine if the file or folder is already in RVM 214. If the file or folder is already in RVM 214, this indicates that the file or folder is already in the local cache. Selection filter 296 adds the file or folder to the in-memory selective synchronization node model 275 of selection tree module 272 as a hard sync selection file or folder. Responsive to the object being added to selective synchronization node model 275, selection tree module 272 adds the object to SSM 274 as a hard sync selection. If the file or folder is not already in RVM 214, selection filter 296 also passes the create event to remote downlink module 232.

If the event is an event to delete an object (file or folder) from a hard sync selected folder, filter 276 passes the event notification to remote downlink module and deletes the object (and for a folder, any subfolders or files) from the in-memory selective synchronization node model 275. Responsive to an object being removed from the selective synchronization node model 275, selection tree module 272 removes the object from SSM 274.

If a notification is received for an action that involves creating a file or folder in a folder that is a soft sync selection, selection filter 296 checks the RVM 214 to determine if the file or folder is already in RVM 214. If the file or folder is not already in RVM 214, selection filter 296 blocks the event. In this case, a new file or folder created at the server 290 is not synchronized with the local cache. The user may still select the file or folder for synchronization using the selective synchronization UI if the user wishes to synchronize the new file or folder. If the file or folder is already in RVM 214, this indicates that the file or folder was added locally and should be synchronized. Selection filter 296 adds the file or folder to the in-memory selective synchronization node model 275 of selection tree module 272 as a hard sync selection file or folder. Responsive to the object being added to selective synchronization node model 275, selection tree module 272 adds the object to SSM 274 as a hard sync selection.

If a notification for an action to move a file or folder from a synchronized folder to a non-synchronized folder is received from server 290, selection filter 276 changes the move event to a delete event to delete the file or folder from the local peer source folder. Selection filter 276 may also delete the appropriate node from the selective synchronization node model 275 and selection tree module 272, which for a folder, also removes nodes for subfolders and files from the selective synchronization node model 275. Responsive to removal of a node from selective synchronization node model 275, delete the node from SSM 274.

On the other hand, if a notification is received to move a file or folder from a non-synchronized folder to a folder hard selected for synchronization, selection filter 276 generates a create event to create a local peer of the moved file or folder in the local peer of the synchronized destination folder. Selection filter 276 adds the appropriate node for the moved file or folder to the selective synchronization node model 275 as a hard sync selection and selection tree module 272 adds the node to SSM 274. If the moved item is a folder, selection tree module 272 may also communicate with server 290 (via sync agent 202) to update the selection tree model and SSM 274 with information for the subfolders and files of the moved folder. Selection tree module 272 generates events to cause remote downlink module 232 to update RVM 214 to add the file that was the subject of the move or add the folder that was subject to the move and the decedents of the folder.

If a notification is received to move or delete the last remaining file or folder from a soft selected parent folder, filter 276 can pass the event to delete the file or folder to remote downlink module 232 and generate an additional message to delete the soft selected parent folder from the local cache.

Figure 4:
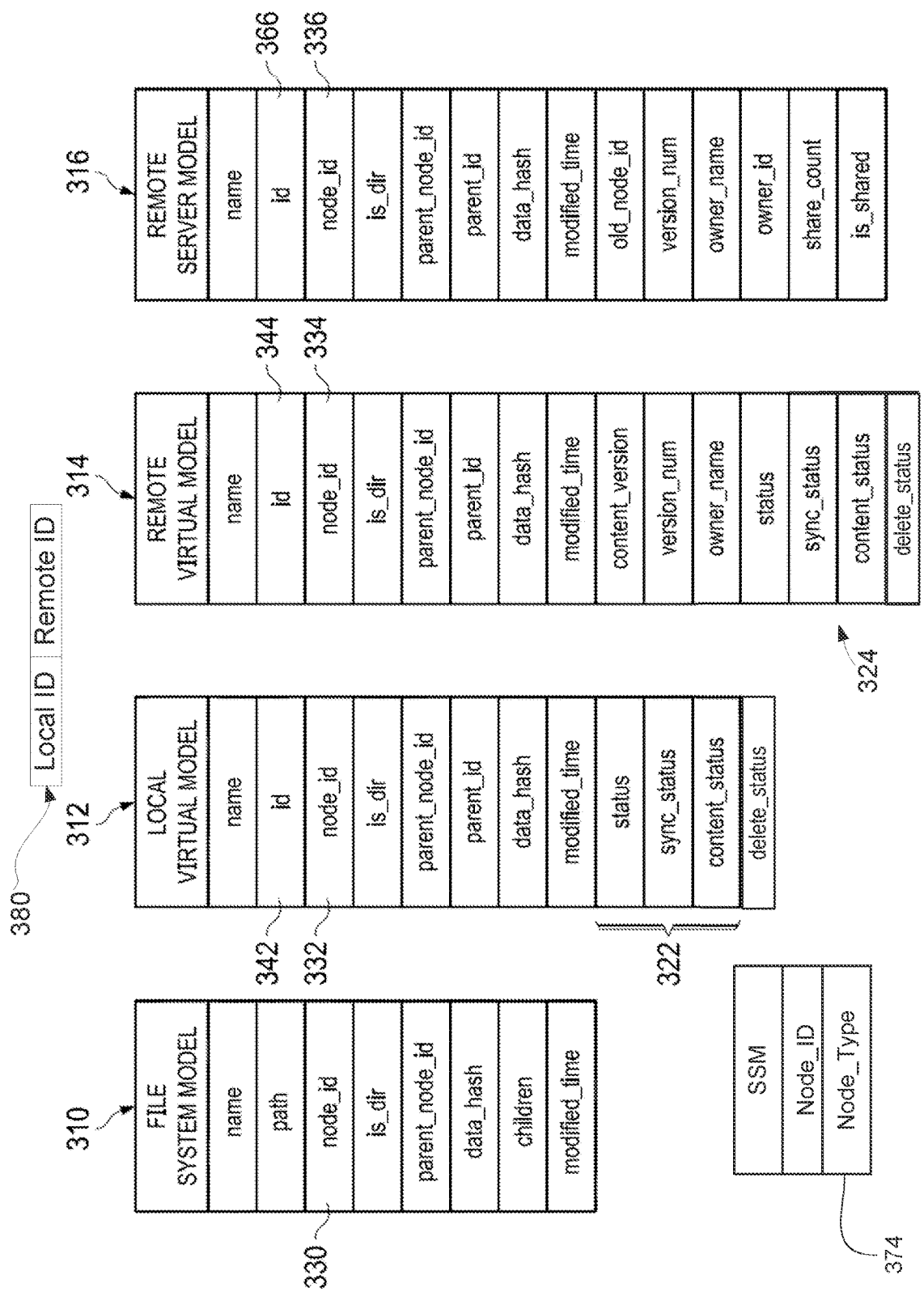
FIG. 4 is a diagrammatic representation of one embodiment of a set of synchronization models.

Remote downlink module 232 may process events, such as events to create, update, move or delete objects. For a delete event, remote downlink module 232 deletes the entry for an object from the RVM 214. For a create event, remote downlink module 232, collects information for a file or folder according to RSM 216 and creates an entry for the file or folder in RVM 214. For an update event, remote downlink module 232 collects information for a file or folder according to RSM 216 and compares the information from RSM 216 for a file or folder to RVM 214. If there is a discrepancy, remote downlink module 232 can resolve the differences by updating RVM 214 for the file or folder such that RVM 214 reflects the current state of the remote server 290 for the file or folder. Containment may be specified in child nodes (e.g. by parent_node_id as illustrated in FIG. 4). As such, the information for a folder returned by server 290 may not specify the items contained in the folder and thus, the fact that a folder on server 290 may contain a file that is not reflected in RVM 214 may not register as a discrepancy at remote downlink module 232.

In response to being triggered by remote downlink module 232 for a change to RVM 214, sync engine downlink module 252 accesses LVM 212 for data associated with the local peer file or folder and can compare LVM 212 to RVM 214 for the file or folder. Sync engine 250 may implement rules to identify conflicts. If no conflict is identified, but there is discrepancy between LVM 212 and RVM 214 for the file or folder, sync engine downlink module 252 can update LVM 212. For a non-delete event, if there is no corresponding entry for a file or folder in LVM 212, sync engine downlink module 252 can create a partial entry in LVM 212. If there is an existing entry for the file or folder in LVM 212, sync engine downlink module 252 can update the entry for the file or folder in LVM 212 to reflect the stale state. For example, updating the entry for the file or folder in LVM 212 may include marking attributes of the file or folder stale in LVM 212 based on the RVM 214 or marking file or folder for deletion in LVM 212. At this point LVM 212 reflects a synchronization state for the local cache indicating that the local cache is out of sync with server 290 for the file or folder.

Sync engine downlink module 252 triggers local downlink module 222 to process the changes to LVM 212. Local downlink module 222 can process information in LVM 212 and compare the information in LVM 212 to information from file system 280 for a file or folder. For example, if the last modified date for a file in the file system is greater than that in LVM 212, this may indicate a version conflict. If a conflict is identified (e.g., a version conflict or other conflict), a conflict handler can be called. If there is no conflict, but LVM 212 is stale for the file or folder, local downlink module 222 can synchronize the local cache with remote server 290. This may include, for example, creating, deleting or modifying files or folders, writing a copy of a remotely stored file to file system 280 or otherwise modifying file system 280. The metadata from RVM 214 is passed to local downlink module 222 and local downlink module can update the metadata for the local peer in file system 280 as needed. If content data has changed, local downlink module can signal sync agent 202 to stream the file content to the local cache. In one embodiment, if sync agent 202 is going to stream a new file to local cache, local downlink module 222 can write a dummy file with the same filename in the local cache as a placeholder and the sync agent 202 can stream the content to that file. Local downlink module 222 can then update the LVM 212 to include the current state of the file on the file system and update the status in LVM to indicate that the local peer copy of the file is synchronized with the remote peer copy. For a delete event, local downlink module 222 deletes the file or folder from the file system 280 and removes the entry for the file or folder from the LVM 212.

Synchronization can be bi-directional. According to one embodiment, synchronization manager sync engine module 204 includes a local watcher 208 configured to monitor file system 280 for events (e.g., changes to files or folders in the local cache). Local watcher 208 is configured to monitor file system 280 by registering with the operating system for automatic event notifications for folders corresponding to the local cache, registering for automatic event notifications for files in the local cache, polling the file system metadata of folders and files in the local cache or otherwise monitoring the local cache. Local watcher 208 may detect various events through monitoring.

Local watcher 208 may queue events and filter events. According to one embodiment, rules may be specified such that certain events do not cause synchronization to server 290. For example, Microsoft® Windows® operating systems often create temporary (*.tmp) files for management purposes in the same directory as a file opened in an editing application, but it may not be desirable to synchronize these temporary files to server 290. Thus, filter rules can be applied by local watcher 208 to filter out certain events, such as events on temporary files. In addition, an operating system may provide notifications for any number of events with respect to a file. In some cases, the operating system events may be queued by local watcher 208 and local watcher may apply rules to determine that an event has occurred based on a combination of event notifications provided by the file system. As another example, on APPLE MAC OS X operating system, modifying the contents of a document generally results in the original document on the file system being deleted and the new contents written as a new file with the same file path; thus a filter rule can be applied that ignores the file deletion when followed immediately by a file creation with the same path so that when synchronized to the remote system the new content can be added as a new version instead of deleting and re-creating the remote copy.

If an event is not filtered out, local watcher 208 triggers local uplink module 224 to read file system metadata, files or other information from file system 280. In response to an event notification from local watcher 208, local uplink module 224 can locate information for that file or folder in LVM 212 (if present) and, if there has been a change to the file or folder, local uplink module 224 can resolve differences between information from file system 280 and LVM 212 by updating LVM 212 for the file or folder. For a delete event notification, the entry for the file can be deleted in the LVM 212, though if the delete event notification resulted from local downlink module 222 deleting the file or folder, the entry for the file or folder may already be deleted from LVM 212. For a non-delete event notification for a file or folder for which there is no entry in LVM 212 (indicating a new file), the local uplink module can update the LVM 212 for the file as appropriate (including assigning an internal id for a new file). In some cases, local uplink module 224 can use data read from or derived from information in file system 280 to construct a FSM 210 of the file or folder and can compare the FSM 210 to LVM 212 to identify changes in the file system.

Local uplink module 224 triggers sync engine uplink module 254 to process a change to LVM 212. In response to being triggered for a change to LVM 212, sync engine uplink module 254 can access RVM 214 for data associated with the remote peer file or folder and can compare LVM 212 to RVM 214 for the file or folder. Sync engine may implement rules to identify conflicts. If a conflict is identified, a conflict handler can be called to address the conflict. If no conflicts are identified, but there is a discrepancy between LVM 212 and RVM 214 for the file or folder, sync engine uplink module 254 can update RVM 214 for the file or folder and notify remote uplink module 234 of the changes to RVM 214. For a non-delete event, if there is no corresponding entry for a file or folder in RVM 214, sync engine uplink module 254 can create a partial entry in RVM 214. If there is an existing entry for the file or folder in RVM 214, sync engine downlink module 212 can update the entry for the remote peer file or folder in RVM 214 to reflect a stale state. Updating the entry for the file or folder in RVM 214 may include marking attributes of the file or folder stale in RMV 214 based on LVM 212 or marking the file or folder for deletion in RVM 214. At this point, the synchronization state for the file or folder modelled by RVM 214 will indicate that the remote server is out of sync with the local cache for the file.

Sync engine uplink module 254 triggers remote uplink module 234 to process changes to RVM 214 made by sync engine uplink module 254. Remote uplink module 234 can process information in RVM 214, retrieve information from server 290 and compare the information in RVM 214 for a file or folder with the information from server 290 about the remote peer file or folder. In some embodiments, remote uplink module 234 may construct an RSM 216 to facilitate comparing information from remote server 290 with RVM 214. Remote uplink module 234 may implement rules to identify conflicts. For example, if the latest file version retrieved from server 290 is greater than that in RVM 214 this may indicate a version conflict (e.g., that a user updated a version of the file in the local cache that is not the current version on the server because, for example, the user was working offline for a period of time). If a conflict is identified, a conflict handler can be called to address the conflict.

If no conflicts are identified, but the RVM 214 indicates a stale state, remote uplink module can update remote server 290. In one embodiment, remote uplink module 234 can signal sync agent 202 to update server 290. Updating server 290 may include, for example, creating, deleting or modifying files or folders on server 290, sending updated metadata for a file or folder to server 290, uploading a copy of a locally cached file (or modified blocks) or sending other information to remote server 290. If the update is not successful, synchronization manager 200 can implement error handling routines. If the update is successful, remote uplink module 234 can update RVM 214 accordingly to reflect the updated state at server 290.

When the new file is uploaded to server 290 or folder created on server 290, server 290 can send a create notification to synchronization manager 200 to create the file the file or folder. As discussed above, when selection filter 276 receives a create file or folder event, it can check the RVM 214 and determine if the file or folder is already in RVM 214. If the object is already in RVM 214, the object may be added to the in-memory selective synchronization node model 275 of selection tree module 272 and to SSM 274. The selective synchronization module 270 can thus determine that it already has the file or folder at the proper location in its local cache, indicating that synchronization manager 200 uploaded the file to server 290 in the first place. Synchronization manager 200 can designate the file or folder as a file or folder hard selected for synchronization based on the assumption that the user wants to synchronize files and folders created in the local cache.

Thus, according to one embodiment, when a new file is added to the local cache, the default can be to designate the file for synchronization. The file can be uploaded to the server and then synced back from server 290 to synchronization manager 200, maintaining a server master/client synchronization manager slave relationship.

Synchronization manager 200 can include a number of error handlers. The error handlers may be specific to types of errors and may be triggered when an error is received or detected. Each error handler can include rules for handling a specific type of error. An error handler may, in some cases, update RVM 214 or LVM 212. In some cases, an error handler may simply mark a file as being subject to an error (e.g., with an overlay on a file icon for the file).

In addition or in the alternative, the synchronization manager 200 can include rules for identifying conflicts. Conflict handlers may be provided to address conflicts related to selective synchronization. For example, when a file/folder is moved in the local cache and creates a name conflict in its new location with a sibling that is unchecked/unselected for synchronization, a conflict handler may be triggered to move the file move back to its previous place and generate a notification to the user. Similarly, when a file/folder is renamed on a user's local cache and it has a name conflict with a sibling that is unchecked/unselected for synchronization, a conflict handler may revert the newly renamed file should revert to its previous name and generate a notification to the user. When a folder is added to the local cache and it has a name conflict with a sibling that is unchecked/unselected for synchronization, an error handler can move the newly created folder to the conflict folder, and generate an error notification. Other examples of addressing conflicts and errors are described in the Synchronization Application.

FIG. 4 illustrates one embodiment of various data models that may be used by a synchronization manager. File system model (FSM) 310 is a model representing data maintained by the local file system for folders or files in the local cache or that can be derived from the folders or files in local cache. Remote server model (RSM) 316 is a model representing data maintained by a remote server for files or folders. Local virtual model (LVM) 312 and remote virtual model (RVM) 314 are virtual models maintained by a synchronization manager to facilitate synchronization. Selective synchronization model (SSM) 374 is a model of hard and soft selections. FSM 310, LVM 312, RVM 314, RSM 316, SSM 374 may be examples of FSM 210, LVM 212, RVM 214, RSM 216 and SSM 274 of FIG. 3, respectively. In some embodiments, these models may be maintained in transient memory by the synchronization manager during operation.

FSM 310 is an internal representation of a file or folder generated from several data sources. The data hash can be generated by the synchronization manager (e.g., by the local downlink module 222 or local uplink module 224), the name and path are provided by the file system while the node_id is provided by an operating system specific function. In one embodiment, data hashes are generated over various portions of file content (say every 4 kb of file data) so that the changed portions of the content may be identified and the file synchronized by sending only the changed portions to the server. The node_id in FSM 310 may be the id used by the operating system to represent a file's location on disk. RSM 316 is based on a data model provided by the remote system, but modified by the synchronization manager to allow easy comparison with the RVM 314. RSM 316 may include metadata gathered from the remote system about an object, such as file/folder name, id, node_id, etc. or other information about the object (e.g., such as one or more hashes calculated from the content of a file as uploaded by the synchronization manger or calculated by the server). FSM 310 and RSM 316 can be generated by the synchronization manager to provide an abstraction of the file or folder in the file system or on the remote system. In accordance with one embodiment, FSM 310 and RSM 316 can be generated on-demand for use in a current synchronization process and are transient.

In general, LVM 312 models the current state of objects in the local cache and includes various attributes for the objects collected according to FSM 310 or provided by the synchronization manager. In the illustrated embodiment, LVM 312 includes a set of statuses 322. According to one embodiment, the various statuses 322 map directly to attributes of the model 312 and are used to determine which attributes need to be updated. The sync engine 250 can mark a status as dirty indicating that the file system is stale with respect to that attribute, during sync processing, each "dirty" status can trigger the synchronization manager to perform a local update. For example, if the content_status for a file is marked as dirty in LVM 312, local downlink module 222 can signal the sync agent to download and save the updated file. Once the file is updated in the local cache, local downlink module 222 can generate a hash of the file, update the data_hash and any other attributes in LVM 312 for the file and clear the "dirty" status. As another example, if the name_status for a file (not shown) is marked as dirty, local downlink module 222 can update the name of the file in the local file system, update the name in LVM 312 and clear the name_status for the file in LVM 312. In addition or in the alternative, LVM 312 may include more general statuses such as a status that indicates that the file system is stale with respect to an object without indicating the particular attribute that is stale. For example, LVM 312 entries may include a delete_status to indicate whether a local peer file should be deleted from local cache 280.

In general, RVM 314 models the current state of objects at the remote system and includes various attributes for the objects collected according to RSM 316. In the illustrated embodiment, RVM 314 includes a set of statuses 324. According to one embodiment, the various statuses 324 map directly to attributes of the model 314 and are used to determine which attributes need to be updated. The sync engine 250 can mark a status as dirty indicating that the file system is stale with respect to that attribute, during sync processing, each "dirty" status can trigger the synchronization manager to perform a local update. For example, if the content_status for a file is marked as dirty in RVM 314, remote uplink module 234 can signal the sync agent to upload the updated file. Remote uplink module 234 can then retrieve a data hash of the file from the server, update the data_hash and any other attributes in RVM 314 for the file and clear the "dirty" status. As another example, if the name_status for a file (not shown) is marked as dirty, remote uplink module 234 can signal the sync agent to send a request to update the name of the file on the remote server, update the name in RVM 314 and clear the name_status for the file in RVM 314. In addition or in the alternative, RVM 314 may include more general statuses such as a status that indicates that the remote system is stale with respect to an object without indicating the particular attribute that is stale. For example, RVM 314 entries may include a delete_status to indicate whether a remote peer file should be deleted from the server.

It can be noted that different systems may use different ids for objects. With respect to one embodiment, for example, node_id 330 and 332 may refer to the node_id typically assigned by a local operating system to track an item's location on disk. In some circumstances, an operating system may change the node_id. The synchronization manager can therefore assign a unique id 342 to each file or folder. If the node_id 330 changes, the correspondence between an item represented by FSM 310 and the model of the item in LVM 312 can be determined based on one or more of the path, name, is_dir, parent_node_id, data_hash in FSM 310 and entries for a file or folder in LVM 312. The node_id 332 and other attributes for the file or folder can then be updated accordingly in LVM 312.

On the other hand, node_id 334 and 336 may refer to a node_id assigned by the remote system such as to track all versions of a file together. Id 344 may be a unique id assigned to a remote object by synchronization manager 200. Id 366 may be an id used by the remote server to identify an object. If the node_id 336 changes, the correspondence between an item represented by RSM 316 and the model of the item in RVM 314 can be determined based on one or more of the name, is_dir, parent_node_id, parent_id, data_hash, old_node_id in RSM 316 and entries for the item in RVM 314. The node_id 334 and other attributes for the item can then be updated accordingly in RVM 314.

In one embodiment, ids 344 and 342 for corresponding local and remote peers may not match. The synchronization manager 200 can maintain an id map (e.g., table or other data structure) mapping ids 344 to ids 342 to map the unique id in RVM 314 for a remote peer to the unique id in LVM 312 for the local peer.

SSM 374, according to one embodiment, specifies a tree of nodes corresponding to the files and folders selected for synchronization and folders, in a content navigation structure, above each file or folder selected for synchronization. The SSM 374 may specify whether each node was hard selected or soft selected for synchronization. According to one embodiment, SSM 374 includes, for each file or folder, a node_id of the hard/soft selected nodes (e.g., an id such as 334, 366 as discussed below or other id to identify a file or folder to be synchronized) with an additional "node_type" that specifies whether the file or folder was hard selected or soft selected. For example, the node_types can be "RemoteSelectedFolder" for a hard selected folder, "RemoteSelectedFile" for a hard selected file and "RemoteSoftSelectedFolder" for a soft selected folder. SSM 374, according to one embodiment, may be maintained as a local, on-disk representation of sync selections.

Synchronization manager 200 can store the LVM, RVM and SSM to persistent storage (e.g., disk) periodically or when synchronization manager 200 closes. Thus, at startup, the synchronization manager 200 can load a previously stored LVM, RVM and SSM from storage and use the models to synchronize the server and local cache.

Figure 5:
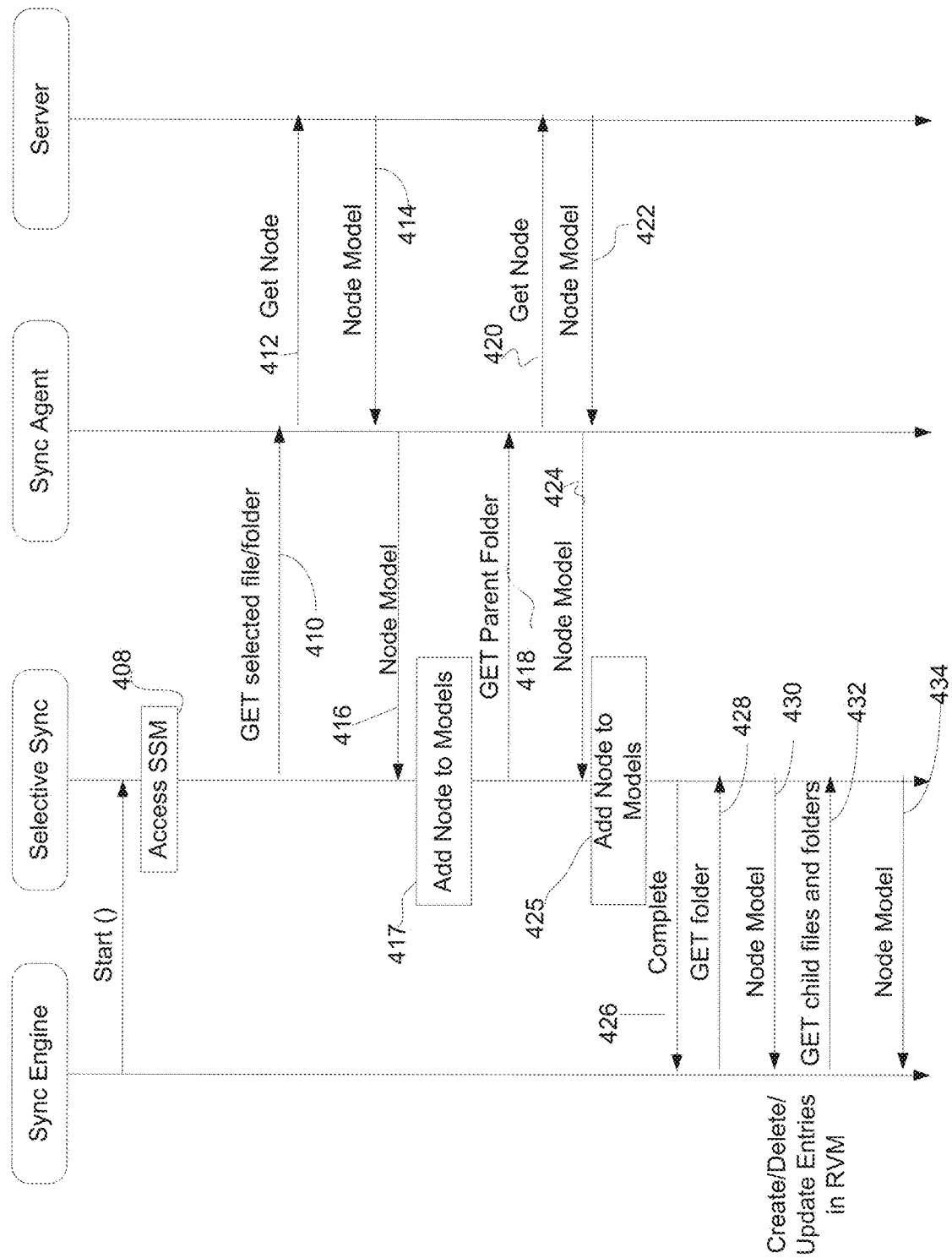
FIG. 5 is a flow diagram illustrating one embodiment building and using an in-memory selective synchronization node model at startup.

With reference to FIG. 5, one embodiment of a startup process for building a selective synchronization node model and updating the RVM to reflect the state of a server for files or folders selected for synchronization is illustrated. Further reference is made to FIGS. 3 and 4. The startup process identifies files and folders for which entries in RVM 214 are to be created, updated or deleted. As discussed above, sync agent 202 may log on to server 290 on behalf of the user when synchronization manager 200 starts up (not shown).

At startup, selection tree module 272 accesses SSM 274 and reads object ids of objects selected for synchronization (step 408) (e.g., a unique object id or node id). Selection tree module 272 signals sync agent 204 to retrieve, from server 290, information for a file or folder selected from SSM 274 (step 410) and sync agent 204 requests the information for the selected file or folder (step 412). If the file or folder cannot be found on the remote server, for example if the server returns a notification that a remote peer copy of the file or folder does not exist, this indicates that the file or folder previously existed remotely but has been deleted there. In one embodiment, sync agent 202 passes the notification that the file or folder cannot be found at server 290 to selection tree module 272 and selection tree module 272 removes the file or folder from SSM 274.

If the file or folder exists at server 290, server 290 returns a node model for the selected file or folder to sync agent 204 (step 414) and sync agent 204 forwards the node model to selection tree module 272 (step 416). The node model for a file or folder can include at least a portion, if not all, the information illustrated in RSM model 316 for a file or folder, including a parent id for the container (e.g., folder) of the selected file or folder. Selection tree module 272 creates an entry for the file or folder in selective synchronization node model 275 for the file or folder and populates the entry with the node model information returned by server 290 for the selected file or folder. The entry can also include an indication of whether the file or folder was hard or soft selected.

If information for the parent folder of a file or folder for which server 290 returned a node model is not already populated in selective synchronization node model 275, selection tree module 272 can request that sync agent 204 get the information for the parent folder (step 418). Sync agent 204 requests the information for the parent folder from server 290 (step 420). Server 290 returns the node model for the parent folder (step 422) and sync agent 204 forwards the node model for the parent folder to selection tree module 272 (step 424). Selection tree module 272 adds an entry for the parent folder to selective synchronization node model 275 if selective synchronization node model 275 does not already include an entry for parent folder (step 625). The entry can include the node model information returned by server 290 for the parent folder and an indication of whether the folder was hard selected or soft selected. Selection tree module 272 may also add an entry for the parent folder to SSM 274 if the folder is not represented in SSM 274. Steps 418-425 can be repeated to traverse up the content navigation hierarchy from a selected object. Steps 408-425 can be repeated for each object in SSM 274.

Selective synchronization module 270 can thus build the in-memory selective synchronization node model 275 to include current metadata gathered from server 290 about objects, such as file/folder name, id, node_id, or other information about the object. The in-memory selective synchronization node model 275 may further include information to designate whether object was explicitly selected for synchronization or included in the model due to its hierarchical relationship with an object explicitly selected for synchronization. Synchronization node model 275 may further include other information that may be used in rules applied by selection filter 276. This process can be repeated for each file or folder hard or soft selected for synchronization (e.g., represented in the SSM 274) until the in-memory selective synchronization node model 275 is populated for all the files and folders hard or soft selected for synchronization.

When the in-memory model 275 is fully populated, the selective sync module 270 can notify remote downlink module 232 (step 426). This signals remote downlink module 432 to request information for each remote folder or file to be synchronized to the local cache in file system 280. For example, remote downlink module 232 requests the folder information for the top level folder available to the user (step 428). Selection tree module 272 replies with an object state (e.g., all or a portion of the information in RSM 316, such as, object id, name, type, version) from in-memory selective synchronization node model 275 (step 630).

Remote downlink module 232 compares the object state information from selective synchronization node model 275 for the root node to the entry for the root node in RVM 214. If there is a discrepancy, remote downlink module 232 can update the entry for the root node in VRM 314 with updated information from selective synchronization node model 275.

If the root object node model indicates that the root object has children nodes (e.g., the top level folder contains files or folders selected for synchronization), remote downlink module 232 requests information for each child file and folder (step 432). Selection tree module 272 replies with the node model for each child folder or file (step 434). If there is no entry in RVM 214 for a file or folder represented in in-memory model 275, remote downlink module 232 creates an entry for the file or folder in RVM 214, for example assigning an id 344 and populating attribute values with values from the in-memory model 275. If there is an entry for the remote peer file or folder in RVM 214, remote downlink module 232 compares a set of attributes of the RVM entry for the file or folder with corresponding attributes from in-memory model 275 for the remote peer file or folder and, if there is a discrepancy in the attribute values, updates RVM 214 with the current attribute values. Steps 432-434 can be repeated for each file or folder to be synchronized.

Figure 6:
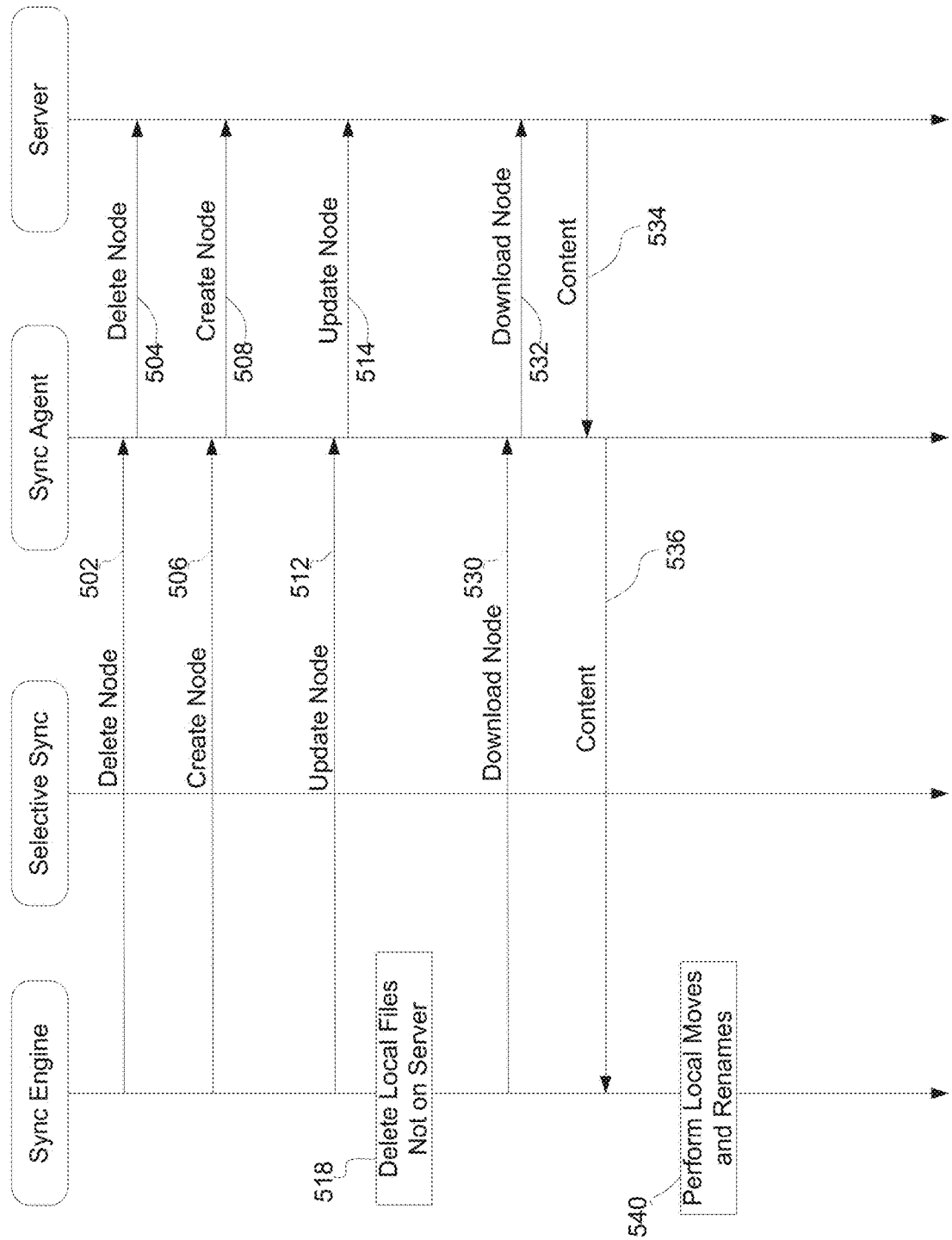
FIG. 6 is a flow diagram illustrating one embodiment of a startup sequence.

As discussed below, the changes to RVM 214 based on selective synchronization node model 275 may be used to synchronize files and folders from server 290 to the local cache. FIG. 6, for example, is a flow chart illustrating one embodiment of a sequence for synchronizing a local cache to the server. In the embodiment of FIG. 6, changes to the local cache are synchronized to server 290 and then changes at server 290 are synchronized to the local cache.

According to one embodiment, the startup process of the synchronization manager 200 traverses the local objects (files and folders) available to synchronization manager. More particularly, if there are objects in the local cache, the startup process signals local uplink module 224 to query the file system 280 for the state of files and folders in the cache and generate the FSM 210 for each file and folder in the local cache. For a file or folder found in the local cache, the startup process determines if a corresponding file or folder entry is found in LVM 212. For example, the startup process compares attributes in the FSM 210 to the LVM 212 to identify if an LVM entry exists for the file or folder. Local uplink module 224 can, for example, use the name, node_id, path, data_hash or other information according to file system model 210 to identify the entry for the file or folder in LVM 212.

The startup process identifies files or folders that have been deleted from the local cache by comparing the information returned from FS 280 to LVM 212 loaded at startup. More particularly, sync engine module 204 determines if there is an entry for a file or folder in LVM 212 loaded at startup for which the corresponding file or folder does not exist in file system 280. If there is no file or folder in file system 280 for an entry in LVM 212, the startup process can remove the entry from LVM 212 and trigger sync engine 250 to process the change. If there is an entry for the file or folder in RVM 214, sync engine 250 marks the entry for the file or folder in RVM 214 as stale (e.g., marks the file or folder for deletion) and triggers remote uplink module 234 to process the delete. Remote uplink module 234 can signal sync agent 202 to update server 290 (step 502) and sync agent 202 signals server 290 to delete the file or folder (step 504). If the delete is successful, remote uplink module 234 deletes the file or folder from RVM 214. If the delete is not successful an error handler can be called. Steps 502-504 can be repeated for each file or folder to be deleted from server 290 during startup.

If there is no entry in LVM 212 for a file or folder detected in the local cache, thus indicating a new file or folder was added to the local cache, the synchronization manager creates an entry for the file or folder in LVM 212. According to one embodiment, the startup process assigns an id 342 to the file or folder, populates the entry with attribute values from FSM 210 and triggers sync engine 250 to process the change to LVM 212. Sync engine 250 creates a partial entry in RVM 214 for the new file or folder and triggers remote uplink module 234 to process the change to RVM 214. According to one embodiment, sync engine 250 assigns an id 344 to the new file or folder and updates map 380. Remote uplink module 234 signals sync agent 202 to create the new file or folder at server 290 (step 506) to synchronize remote server 290 with file system 280. Sync agent 202 interacts with server 290 to create the new file or folder at server 290 and, in the case of new file, upload the new file to server 290 (step 508).

If the create is successful, remote uplink module 234 updates RVM 214 accordingly, setting statuses, updating RVM 214 attributes with updated values, completing an RVM entry for a new file or folder or taking other actions. As discussed above, server 290 may send a notification back to synchronization manager 200 to create a file or folder in the local cache. Synchronization manager 200 updates SSM 274 accordingly. Steps 506-508 can be repeated for each file or folder to be created on server 290 during startup.

If LVM 212 includes an LVM entry for a file or folder detected in local cache, the startup process can determine an entry exists in RVM 214 for a corresponding remote peer file or folder (e.g., using map 380). If entries file or folder are found in LVM 212 and RVM 214, the startup process can determine if the file or folder can be located on the remote server 290. For example, the startup process can signal the sync agent 202 to request the state of the remote peer copy of the file or folder.

For a file or folder that is found locally and for which a remote peer exists on the remote system, the synchronization manager 200, during the startup process, updates the LVM 212 with the state of the file as appropriate. According to one embodiment, synchronization manager compares a set of attributes of the LVM entry for the file or folder with corresponding attributes of FSM 210 and, if there is a discrepancy in the compared attribute values, updates LVM 212 using the attribute values from FSM 210. With reference to FIG. 4, for example, the synchronization manager can compare the corresponding name, data_hash, is_dir, parent_node_id and modified_time values to determine if the FSM and LVM match. If there is a discrepancy in the compared attribute values, the startup process updates LVM 212 using the attribute values from FSM 210.

Synchronization manager 200 further determines if the state for the local peer file or folder in LVM 212 matches the state for the remote peer file or folder in the RVM 214 and, if not, updates RVM 214 accordingly. According to one embodiment, sync engine 250 compares a set of attributes of the LVM entry for the file or folder with corresponding attributes in the RVM entry for the remote peer copy of the file or folder and, if there is a discrepancy in the compared attribute values, updates RVM 214 by marking the RVM entry stale. In some embodiments, the RVM entry is marked stale by marking specific attributes as stale.

If the synchronization manager updates RVM 214 for a file or folder, remote uplink module 234 can query server 290 (via sync agent 202) for information related to the file or folder according to remote server model 216 and compare the information for the folder or file in the RSM 216 with corresponding information for the file or folder in RVM 214. For example, local uplink module 234 can compare a set of attributes of the RVM entry for the file or folder with corresponding attribute values from the RSM. If the entry for the file or folder in RVM 214 differs from that retrieved from the server based on the comparison, remote uplink module 234 can determine if a conflict exits, such as a version conflict or other conflict. If a conflict exists, remote uplink module 234 can call a conflict handler. If there is no discrepancy between the compared attribute values or the differences between the attributes returned by server 290 and the corresponding information in RVM 214 for the file or folder do not result in a conflict or other error, remote uplink module 234 can update the remote server appropriately (e.g., with the updated information from sync engine uplink module 254). According to one embodiment, remote uplink module 234 signals sync agent 202 to upload a file to server 290, send updated attributes to server 290 or take other actions to synchronize remote server 290 with file system 280 (step 512) and sync agent 202 cooperates with server 290 to update the remote peer file or folder (step 514). If the update is successful, remote uplink module 234 can update RVM 314 accordingly, setting statuses, updating RVM 314 attributes with updated values or taking other actions. Steps 512-514 can be repeated for each file or folder to be updated on server 290 during startup.

According to one embodiment, if deleting, creating or updating a file or folder at the remote server 290 is not successful, RVM 314 is not updated and the status of the attributes remains "dirty" indicating that the update should be attempted again. An error handler can be called to retry the delete, create or update.

If LVM 212 loaded at startup includes an LVM entry for a file or folder detected in local cache and the RVM 214 loaded at startup includes an entry for a corresponding remote peer file or folder (e.g., determined using map 380), but the file or folder cannot be found on the remote server 290—for example if the server returns a notification that a remote peer copy of the file or folder does not exist—this indicates that the file or folder previously existed remotely (because it was in the RVM 214) but has been deleted there. The sync manager start process removes the file or folder entry from RVM 214 and LVM 212 and deletes the file or folder from the local file system (step 518). Step 518 can be repeated for each file or folder to be deleted from the local cache during startup.

Synchronization manager 200 can also add items discovered at the remote server that should be synchronized (e.g., items specified in SSM 274) and perform local updates to synchronize other changes. In general, synchronization manager 200 uses SSM 274 and data from server 290 to build in-memory model 275. Remote downlink module 232 requests information from selective sync module 270 for each remote folder or file to be synchronized to the local cache in file system 280. One embodiment of traversing the objects at startup to build in-memory selective synchronization node model 275 and update the RVM 214 is discussed above. The startup process triggers sync engine downlink module 252 to process the changes to RVM 214.

Sync engine downlink module 252 compares the RVM entry for a file or folder with a corresponding entry for the local peer file or folder in LVM 212 and updates LVM 212 accordingly. For example, if there is no corresponding entry for the file or folder in LVM 212, sync engine 250 can build a partial entry for the item in LVM 212 from RVM 214 (including assigning an id 342 and updating map 380). If there is an entry for the local peer file or folder in LVM 212, synchronization engine 250 compares a set of attributes of the LVM entry for the file or folder with corresponding attributes of RVM entry for the remote peer file or folder and, if there is a discrepancy in the attribute values, updates LVM 212 by marking the LVM entry stale. In some embodiments, the LVM entry is marked stale by marking specific attributes stale.

If synchronization manager 200 updates LVM 212 for a file or folder, local downlink module 222 can query the file system 280 for information related to the file or folder according to FSM 210 and compare the information for the folder or file according to FSM 210 with corresponding information for the file or folder in LVM 212. For example, local downlink module 222 can compare a set of attributes of the LVM entry for the file or folder with corresponding attribute values from the FSM. If the information in the entry for the file or folder in LVM 212 differs from that retrieved from the file system based on the comparison, local downlink module 222 can determine if a conflict exits, such as a version conflict or other conflict. If a conflict exists, local downlink module 222 can call a conflict handler.

If the corresponding attributes for the file or folder in LVM 212 and FSM 210 are the same or if the differences between the corresponding attributes in FSM 210 and LVM 212 for the file or folder do not result in a conflict or other error, remote downlink module 222 can update the local cache appropriately. For example, for files and folders to be added to the local cache, remote downlink module 222 can create the appropriate folders and files in file system 280 using metadata passed from RVM 214. For a new file or folder synchronized down from the remote server, whether at startup or during live synchronization, the path for the folder or file in file system 280 can be generated at runtime by recursively building the paths of all ancestors up to the root of the cache. As noted above, remote downlink module 222 may create dummy files for new files to which file content can be streamed.

For new files or files having stale file content as indicated by LVM 212, remote downlink module 222 can signal sync agent 202 to download the remote peer file (the new or updated file) from server 290 (step 530). Sync agent 202 communicates with server 290 to request the file content (step 532) and server 290 streams the file to sync agent 202 (step 534). Sync agent 202 writes the content of the new or updated file to the local cache (step 536).

For a folder or file that are indicated as stale in LVM 212, but does not have stale content—for example, a file that was moved or renamed, but did not have its content changed—local download module 222 updates the folder or file metadata in file system 280 for the local peer folders or files using metadata passed from RVM 214. For example, local download module 222 can use metadata from RVM 214 to synchronize renames and moves from server 290 to the local cache (step 540).

If an error occurs when updating the cache, local downlink module 222 can call an error handler. Otherwise, local downlink module 222 updates LVM 212 for the files or folders based on the current state of the file or folder in cache. Steps 530-536 can be repeated for each file having content to be downloaded to the local cache (e.g., each new file or file having updated content to be synchronized and step 540 can be repeated for each file or folder selected for synchronization that is renamed, moved or otherwise updated without changing the file content.

Figure 7:
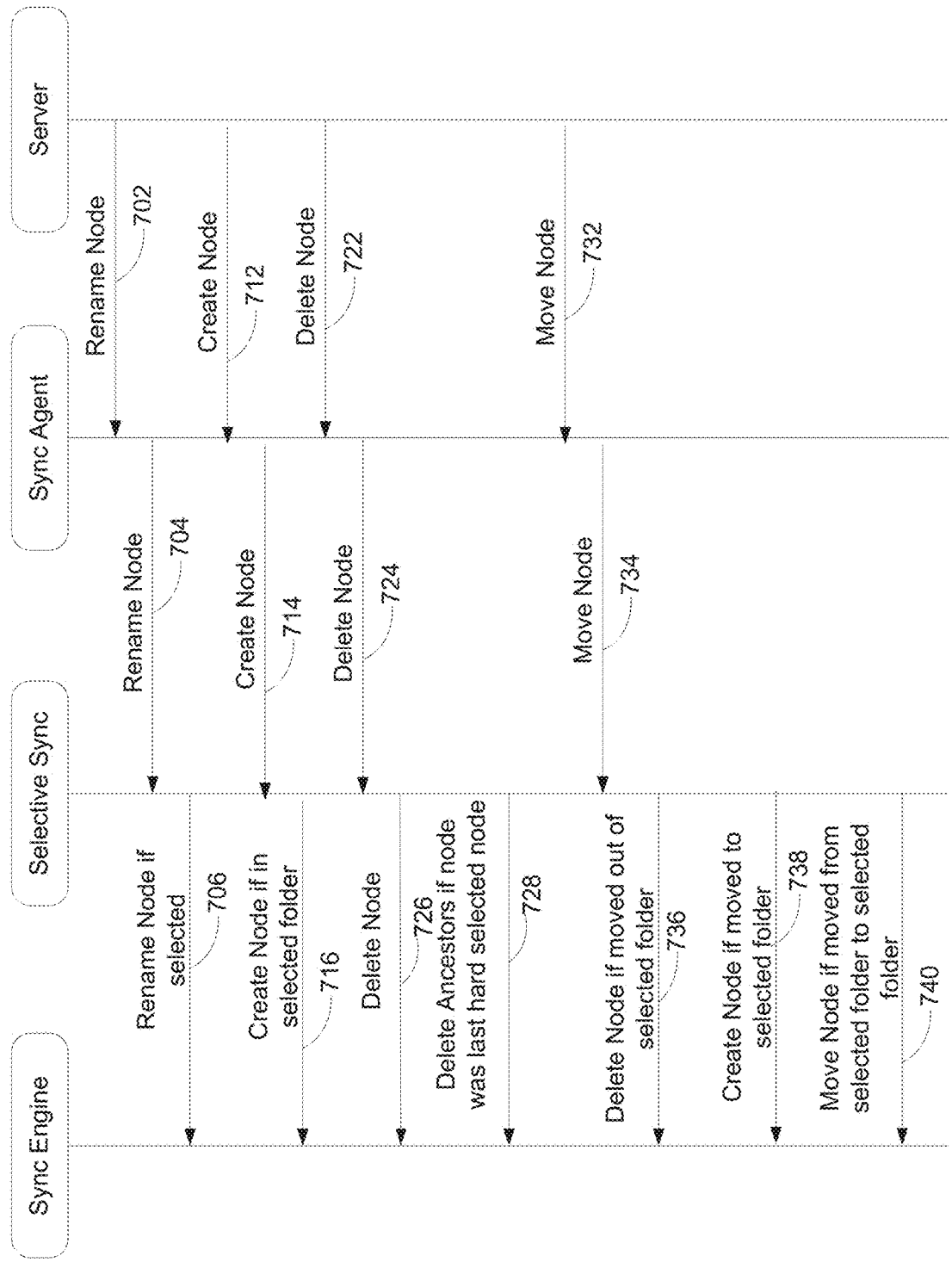
FIG. 7 is a flow diagram illustrating one embodiment of a flow of notifications.

FIG. 7 is a flow chart illustrating one embodiment of a synchronization manager applying rules to filter and modify events. One of ordinary skilled in the art will appreciate that the rules described in conjunction with FIG. 7 are provided by way of example and not limitation and that a synchronization manager can apply a variety of rules in processing events that affect objects selected for synchronization. Further reference is made to FIG. 3 and FIG. 4.

In the example illustrated, sync agent 202 receives a rename event notification (step 702) and remote watcher 260 passes the event notification to sync module 270 (step 704). If the node to be renamed is selected for synchronization (e.g., the node is represented in selective synchronization node model 275), selective sync module 270 updates in-memory model 275 and SSM 274 accordingly and triggers remote downlink module 232 to process the event (step 706). Remote downlink module 232 updates the entry for the file or folder in RVM 214.

As further illustrated, sync agent 202 receives a create node event notification (step 712) and remote watcher 260 provides the event to selective sync module 270 (step 714). If the create event is to create a file or folder in a folder selected for synchronization (e.g., the node is to be created in a folder represented in selective synchronization node model 275) and the file or folder is not already represented in RVM 214, selective sync module 270 updates in-memory model 275 and SSM 274 accordingly and triggers remote downlink module 232 to process the create event. Remote downlink module 232 creates an entry for the file or folder in RVM 214. In some embodiments, as discussed above, the create event may be blocked if the create event is for creating a file or folder in a soft selected folder.

As another example, server 290 sends a delete event notification to sync agent 202 (step 722), which is, in turn provided to selective sync module 270 (step 724). Selective sync module 270 can trigger remote downlink module 232 to process the delete event. Remote downlink module 232 deletes the entry for the file or folder in RVM 214.

Further, if the node indicated for deletion is the last hard selected node in a soft-selected folder, as determined from in-memory model 275, selective sync module 270 triggers delete events at remote downlink module 232 to delete the parent folder of the node and any other ancestors of the node that do not contain any other hard selected descendants (step 728).

At step 732, server 290 sends a move event notification to sync agent 202. Remote watcher 260 provides the move event notification to selective sync module 270 (step 734). If the move node event is to move a node (e.g., file or folder) from a folder selected for synchronization to a folder not selected for synchronization, selective synchronization module 270 removes the node from in-memory model 275 and SSM 274 and triggers a delete event at remote downlink module 232 to delete the node (step 736). Remote downlink module 232, in turn, removes the entry for the file or folder from RVM 214.

On the other hand, the event is to move a file or folder from a non-synchronized folder to a folder hard selected for synchronization, selective sync module adds the appropriate node for the moved file or folder to the selective synchronization node model 275 and SSM 274. Selective sync module 270 further triggers a create node event at remote downlink module 232 to create the file or folder (step 738). Remote downlink module 232 creates an entry for the file or folder in RVM 214. If the moved item is a folder, selective sync module 270 may also communicate with server 290 (via sync agent 202) to update the selective synchronization node model 275 and SSM 274 with information for the subfolders and files of the moved folder. Selective sync module 270 can further generate events to cause remote downlink module 232 to update RVM 214 appropriately for the files or folders contained in the moved file or folder.

If the event is to move a file or folder from a synchronized folder to another synchronized folder, selective sync module 232 can update selective synchronization node model 275 to reflect the new state of the file or folder at server 290 and trigger and event on remote downlink module 232 to update the entry for the file or folder in RVM 232 (e.g., to reflect a new parent node).

Figure 8:
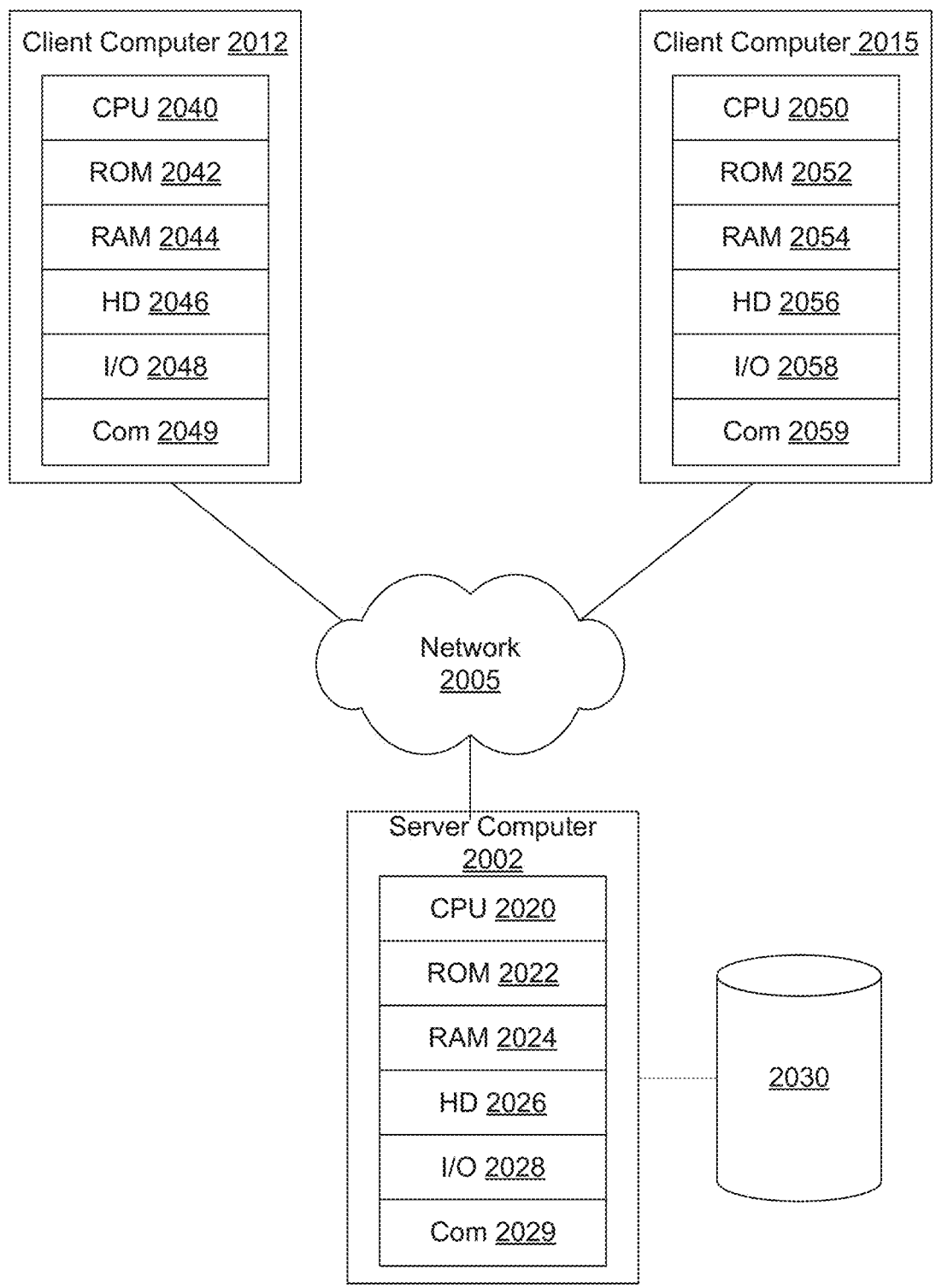
FIG. 8 is a diagrammatic representation of a distributed network system.

FIG. 8 depicts a diagrammatic representation of a distributed network computing environment where embodiments disclosed herein can be implemented. In the example illustrated, network computing environment 2000 includes network 2005 that can be bi-directionally coupled to client computers 2012, 2015 and server computer 2002. Network 2005 may represent a combination of wired and wireless networks that network computing environment 2000 may utilize for various types of network communications known to those skilled in the art. For the purpose of illustration, a single system is shown for each of computer 2002, 2012, and 2015. However, with each of computer 2002, 2012 and 2015 may comprise a plurality of computers (not shown) interconnected to each other over network 2005. For example, a plurality of computers 2002, a plurality of computers 2012 and a plurality of computers 2015 may be coupled to network 2005. Computers 2012, 2015 may include data processing systems for communicating with computer 2002.

Server computer 2002 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005. Computer 2002 may include one or more backend systems configured for providing a variety of services to computers 2012, 2015 over network 2005. These services may utilize data stored in data store 2030. According to one embodiment, server computer 2002 may include computer executable instructions stored on a non-transitory computer readable medium coupled to a processor. The computer executable instructions of server 2002 may be executable to provide a content management application to manage an object data store in which folders and files are managed as objects.

Computer 2012 can comprise CPU 2040, ROM 2042, RAM 2044, HD 2046, I/O 2048 and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058 and communications interface 2059. According to one embodiment, client computers 2012, 2012 run synchronization managers (e.g., synchronization managers 200) to synchronize local file and files with remote peers managed in data store 2030.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 2002, 2012 and 2015 is an example of a data processing system. ROM 2022, 2042, and 2052; RAM 2024, 2044, and 2054; HD 2026, 2046, and 2056; and data store 2030 can include media that can be read by CPU 2020, 2040, or 2050. These memories may be internal or external to computers 2002, 2012, or 2015.

Portions of the methods described herein may be implemented in suitable software code that may reside within ROM 2022, 2042, or 2052; RAM 2024, 2044, or 2054; or HD 2026, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, JAVA, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A system comprising:
    a processor;
    a memory having stored thereon instructions executable by the processor to:
        determine a set of objects in a remote content navigation hierarchy on a remote content management system;
        maintain on a local file system a local content hierarchy, wherein at least a portion of the local content navigation hierarchy comprises objects that are paired with corresponding objects in the remote content navigation hierarchy;
        receive input, via a user interface, the input selecting a synched set of the objects in the local content hierarchy for synchronization with the corresponding objects in the remote content navigation hierarchy, the input further selecting a non-synched set of the objects in the local content hierarchy data resources;
        maintain a selective synchronization model that identifies the synched set of objects and the non-synched set of objects;
        synchronize changes to the synched set of objects with corresponding objects in the remote content management system and blocking synchronization of changes to the non-synched set of objects.

2. The system of claim 1, wherein the instructions are further executable to:
    traverse the remote content navigation hierarchy to identify a set of additional container objects above each selected object in the remote content navigation hierarchy; and
    create additional local objects corresponding to the additional container objects in the local content navigation hierarchy, wherein the additional local objects are arranged in the local content navigation hierarchy.

3. The system of claim 2, wherein the instructions are further executable to:
    build a selective synchronization model including metadata for the selected objects and additional container objects;
    receive a notification from the content management system of an event associated with at least one object in the content navigation hierarchy; and
    filter the notification based on the selective synchronization model.

4. The system of claim 1, wherein the set of objects comprises files and folders.

5. The system of claim 1, wherein the interface is adapted to allow the user to independently select the multiple objects from different levels of the content navigation hierarchy.

6. The system of claim 1, wherein the interface is adapted to allow the user to independently select the multiple objects from the same level of the content navigation hierarchy.

7. The system of claim 1, wherein the user interface combines hierarchy data from the content management system with user selections.

8. The system of claim 1, further comprising instructions executable to:
    monitor the file system for events in the local cache;
    in response to an event in the local cache, determine that a file has been added to the local cache;
    upload the file to the content management system;
    receive a notification from the content management system to create the file in the local cache;
    determine that the file already exists in the local cache; and
    based on determining that the file already exists in the local cache, select the file for synchronization.

9. The system of claim 1, wherein the controls to allow a user to independently select the multiple objects as hard sync selections.

10. The system of claim 9, further comprising instructions executable by the processor to automatically select, as soft sync selections, a parent container object of a hard sync selected object.

11. A computer program product comprising a non-transitory computer readable medium storing computer instructions executable by a processor to:
    determine a set of objects in a remote content navigation hierarchy on a remote content management system;
    maintain on a local file system a local content hierarchy, wherein at least a portion of the local content navigation hierarchy comprises objects that are paired with corresponding objects in the remote content navigation hierarchy;
    receive input, via a user interface, the input selecting a synched set of the objects in the local content hierarchy for synchronization with the corresponding objects in the remote content navigation hierarchy, the input further selecting a non-synched set of the objects in the local content hierarchy data resources;
    maintain a selective synchronization model that identifies the synched set of objects and the non-synched set of objects;
    synchronize changes to the synched set of objects selected objects in the remote content management system and blocking synchronization of changes to the non-synched set of objects.

12. The computer program product of claim 11, wherein the instructions are further executable to:
    traverse the remote content navigation hierarchy to identify a set of additional container objects above each selected object in the content navigation hierarchy; and
    create additional local objects corresponding to the additional container objects in the local content navigation hierarchy, wherein the additional local objects are arranged in the local content navigation hierarchy.

13. The computer program product of claim 12, wherein the instructions are further executable to:
- build a selective synchronization model including metadata for the selected objects and additional container objects;
- receive a notification from the content management system of an event associated with at least one object in the content navigation hierarchy; and
- filter the notification based on the selective synchronization model.

14. The computer program product of claim 11, wherein the set of objects comprises files and folders.

15. The computer program product of claim 11, wherein the interface is adapted to allow the user to independently select the multiple objects from different levels of the content navigation hierarchy.

16. The computer program product of claim 11, wherein the interface is adapted to allow the user to independently select the multiple objects from the same level of the content navigation hierarchy.

17. The computer program product of claim 11, wherein the user interface combines hierarchy data from the content management system with user selections.

18. The computer program product of claim 11, further comprising instructions executable to:
- monitor the file system for events in the local cache;
- in response to an event in the local cache, determine that a file has been added to the local cache;
- upload the file to the content management system;
- receive a notification from the content management system to create the file in the local cache;
- determine that the file already exists in the local cache; and
- based on determining that the file already exists in the local cache, select the file for synchronization.

19. The computer program product of claim 11, wherein the controls to allow a user to independently select the multiple objects as hard sync selections.

20. The computer program product of claim 19, further comprising instructions executable by the processor to automatically select, as soft sync selections, a parent container object of a hard sync selected object.

* * * * *

UNITED STATES PATENT AND TRADEMARK OFFICE
CERTIFICATE OF CORRECTION

PATENT NO. : 11,803,516 B2
APPLICATION NO. : 17/666487
DATED : October 31, 2023
INVENTOR(S) : Brian Alexander Jewell, Brennen Matthew Walsh and Jinshan Yang Page 1 of 1

It is certified that error appears in the above-identified patent and that said Letters Patent is hereby corrected as shown below:

In the Claims

Column 38, Claim 11, Lines 55 and 56 delete "selected objects"

Column 38, Claim 11, Line 56 delete "and"

Signed and Sealed this
Twenty-third Day of April, 2024

Katherine Kelly Vidal
*Director of the United States Patent and Trademark Office*